US006212290B1

(12) United States Patent
Gagne et al.

(10) Patent No.: US 6,212,290 B1
(45) Date of Patent: Apr. 3, 2001

(54) NON-MINUTIAE AUTOMATIC FINGERPRINT IDENTIFICATION SYSTEM AND METHODS

(75) Inventors: Patricia C. Gagne; Carol M. Puterko, both of Coventry, RI (US)

(73) Assignee: TMS, Inc., Warwick, RI (US)

( * ) Notice: Subject to any disclaimer, the term of this patent is extended or adjusted under 35 U.S.C. 154(b) by 0 days.

(21) Appl. No.: 08/337,204

(22) Filed: Nov. 7, 1994

Related U.S. Application Data

(63) Continuation of application No. 08/035,483, filed on Mar. 22, 1993, now Pat. No. 5,363,453, which is a continuation of application No. 07/430,421, filed on Nov. 2, 1989, now abandoned.

(51) Int. Cl.$^7$ .................................................. G06K 9/00
(52) U.S. Cl. ............................................................ 382/125
(58) Field of Search ..................................... 382/100, 115, 382/124, 125, 126, 127, 282; 235/379; 902/4, 5, 6, 21, 25, 26, 28; 340/825.31, 825.33, 825.34

(56) References Cited

U.S. PATENT DOCUMENTS

| | | | |
|---|---|---|---|
| 2,952,181 | 9/1960 | Maurer, Jr. | 88/14 |
| 3,231,861 | 1/1966 | French | 340/149 |
| 3,245,697 | 4/1966 | Nugent | 283/7 |
| 3,292,149 | 12/1966 | Bourne | 340/146.3 |
| 3,383,657 | 5/1968 | Claassen et al. | 340/149 |
| 3,566,354 | 2/1971 | French | 340/146.3 E |
| 3,584,958 | 6/1971 | Miller et al. | 356/71 |
| 3,771,129 | 11/1973 | McMahon | 340/146.3 E |
| 3,801,823 | 4/1974 | Korn | 250/221 |
| 3,944,978 | 3/1976 | Jensen | 390/146.3 E |
| 3,959,884 | 6/1976 | Jordan et al. | 33/1 BB |
| 3,968,475 | 7/1976 | McMahon | 340/146.3 E |
| 4,109,237 | 8/1978 | Hill | 340/146.3 E |

(List continued on next page.)

OTHER PUBLICATIONS

Personal Identification News, Jan. 1989, "Fingermatrix", p. 27.
Personal Identification News, Jan. 1989, "Identix", p. 28.
Personal Identification News, Jan. 1989, "Morpho", p. 30.
Personal Identification News, Jan. 1989, "Thumbscan", p. 34.

*Primary Examiner*—Jose L. Couso
(74) *Attorney, Agent, or Firm*—Paul V. Del Giudice

(57) ABSTRACT

The invention relates to a system and methods for verifying a person's identity, and pertains in particular to such a system and methods which utilize comparison of a fingerprint pattern for identification verification. The image of a fingerprint of a person to be identified is provided on an inkless means which when touched by a finger of the person causes immediate development of an image of the fingerprint of the finger in a black and white appearance. This image of a fingerprint is video scanned to produce image data which is digitized to produce a non-minutiae digitized numerical identifier indicative of the fingerprint. A preferred method and system provides a non-minutiae digitized numerical identifier having 24 bytes of fingerprint identification data which is recordable within the magnetic stripe of a credit card personal to a person, or may be recorded within the confines of a portable personnel identification means, or within a smart card, personal to a person. The non-minutiae digitized numerical identifier is provided by selectively analyzing different parts of a fingerprint and deriving from each part a byte numeric which is directly related to the ridge count computed for that part. Prior to performing the "digitizing" method, a fingerprint identity window is defined as the area of analysis. The present invention also discloses inventive methods relating to "image sizing" and "image framing" which are performed upon the fingerprint image and whitespace digital data stored in memory, prior to defining a fingerprint identity window. Various applications of the invention methods and system are disclosed herein.

38 Claims, 28 Drawing Sheets

U.S. PATENT DOCUMENTS

| | | |
|---|---|---|
| 4,152,056 | 5/1979 | Fowler .................................. 354/62 |
| 4,210,899 | 7/1980 | Swonger et al. ...................... 382/124 |
| 4,325,570 | 4/1982 | Estrada .................................... 283/7 |
| 4,414,684 | 11/1983 | Blonder ................................ 382/124 |
| 4,537,484 | 8/1985 | Fowler et al. ......................... 354/62 |
| 4,618,988 | 10/1986 | Schiller ................................ 382/125 |
| 4,696,046 | 9/1987 | Schiller ................................ 382/125 |
| 4,747,147 | 5/1988 | Sparrow ................................ 382/125 |
| 4,790,564 | 12/1988 | Larcher et al. ........................ 283/69 |
| 4,811,414 | 3/1989 | Fishrine et al. ....................... 382/125 |
| 4,817,183 | 3/1989 | Sparrow ................................ 382/125 |
| 4,874,932 | 10/1989 | Kimizu .................................... 902/5 |
| 4,882,474 | 11/1989 | Anderl et al. ........................... 902/26 |
| 4,896,363 | 1/1990 | Taylor et al. ......................... 382/125 |
| 4,933,976 | 6/1990 | Fishrine et al. ....................... 382/125 |
| 4,944,021 | 7/1990 | Hoshino et al. ...................... 382/125 |
| 4,947,027 | 8/1990 | Golightly ................................ 902/5 |
| 4,947,442 | 8/1990 | Tanaka et al. ........................ 382/125 |
| 5,067,162 | 11/1991 | Driscoll, Jr. et al. ................. 382/125 |

DETERMINATION OF Y-TOP AND Y-BOTTOM VALUES

↓ = DOWNWARD SCANNING    ↑ = UPWARD SCANNING

'→' AND '←' INDICATE LEFT-TO-RIGHT AND RIGHT-TO-LEFT SCANNING DIRECTION

↓ = DOWNWARD SCANNING    ↑ = UPWARD SCANNING

FINAL INDICATION OF FINGERPRINT IMAGE "AREA"

MEMORY IMAGE FRAME VS. WINDOW RELATIONSHIP DIAGRAM

Yc — Y-AXIS CENTER LINE ABSOLUTE COUNT DIAGRAM

→ INDICATE SCANNED LINES

Xam — X-AXIS A-RANGE MAXIMUM ABSOLUTE COUNT DIAGRAM

→ INDICATE SCANNED LINES

SYSTEM BUS PINOUT

| PIN | SIGNAL<br>MMZ8 | DESCRIPTION | DIGITIZER |
|---|---|---|---|
| 1 | +5 | +5 Volt Power Input | +5 |
| 2 | GND | Signal Ground | GND |
| 3 | N/C | No Connection | N/C |
| 4 | AD3 | Multiplexed Address/Data | AD3 |
| 5 | AD4 | Multiplexed Address/Data | AD4 |
| 6 | AD5 | Multiplexed Address/Data | AD5 |
| 7 | AD6 | Multiplexed Address/Data | AD6 |
| 8 | AD7 | Multiplexed Address/Data | AD7 |
| 9 | AD0 | Multiplexed Address/Data | AD0 |
| 10 | AD1 | Multiplexed Address/Data | AD1 |
| 11 | AD2 | Multiplexed Address/Data | AD2 |
| 12 | P2/0 | Port 2 Bit 0 | P2/0 |
| 13 | P2/1 | Port 2 Bit 1 | P2/1 |
| 14 | P2/2 | Port 2 Bit 2 | P2/2 |
| 15 | P2/3 | Port 2 Bit 3 | P2/3 |
| 16 | P2/4 | Port 2 Bit 4 | P2/4 |
| 17 | P2/5 | Port 2 Bit 5 | P2/5 |
| 18 | P2/6 | Port 2 Bit 6 | P2/6 |
| 19 | P2/7 | Port 2 Bit 7 | P2/7 |
| 20 | R/W | Read/Write | R/W |
| 21 | DS | Data Strobe | DS |
| 22 | AS | Address Strobe | AS |
| A | -12 | -12 Volt Power Input | -12 |
| B | +12 | +12 Volt Power Input | +12 |
| C | N/C | No Connection | N/C |
| D | N/C | No Connection | N/C |
| E | P3/1 | Port 3 Bit 1 | P3/1 |
| F | N/C | No Connection | N/C |
| H | P3/2 | Port 3 Bit 2 | P3/2 |
| J | N/C | No Connection | N/C |
| K | P3/5 | Port 3 Bit 5 | P3/5 |
| L | P3/6 | Port 3 Bit 6 | P3/6 |
| M | P3/7 | Port 3 Bit 7 | P3/7 |
| N | P3/0 | Port 3 Bit 0 | P3/0 |
| P | P3/4 | Port 3 Bit 4 | P3/4 |
| R | P3/3 | Port 3 Bit 3 | P3/3 |
| S | A15 | Address Bus | A15 |
| T | A14 | Address Bus | A14 |
| U | A13 | Address Bus | A13 |
| V | A12 | Address Bus | A12 |
| W | A11 | Address Bus | A11 |
| X | A10 | Address Bus | A10 |
| Y | A9 | Address Bus | A9 |
| Z | A8 | Address Bus | A8 |

FIG. 25

MMZ8 Bus Pin Configuration
(End View - Edge Card Connector)

| Component Side | | | Solder Side |
|---|---|---|---|
| − 12 Volts -----→ | A | 1 ←----- | +5 Volts |
| + 12 Volts -----→ | B | 2 ←----- | Ground |
| Reset -------→ | C | 3 ←----- | No Connection |
| No Connection ---→ | D | 4 ←----- | Address/Data 3 |
| Timer Zero Input --→ | E | 5 ←----- | Address/Data 4 |
| $\overline{RD}$ ---------→ | F | 6 ←----- | Address/Data 5 |
| Timer One Input---→ | H | 7 ←----- | Address/Data 6 |
| $\overline{PSEN}$ --------→ | J | 8 ←----- | Address/Data 7 |
| Timer Two Input---→ | K | 9 ←----- | Address/Data 0 |
| Timer Two Trigger -→ | L | 10 ←----- | Address/Data 1 |
| TTL Serial Out ---→ | M | 11 ←----- | Address/Data 2 |
| TTL Serial In ---→ | N | 12 ←----- | Pulse Width Mod. |
| $\overline{\text{Int 0 - DMA Req}}$ --→ | P | 13 ←----- | $\overline{\text{Interrupt 1}}$ |
| $\overline{\text{DMA Acknowledge}}$ --→ | R | 14 ←----- | $\overline{\text{Program Enable}}$ |
| Address 15 -----→ | S | 15 ←----- | $\overline{\text{Program Pulse}}$ |
| Address 14 -----→ | T | 16 ←----- | No Connection |
| Address 13 -----→ | U | 17 ←----- | No Connection |
| Address 12 -----→ | V | 18 ←----- | No Connection |
| Address 11 -----→ | W | 19 ←----- | No Connection |
| Address 10 -----→ | X | 20 ←----- | $\overline{RD}/\overline{WR}$ |
| Address 9 -----→ | Y | 21 ←----- | $\overline{DS}$ |
| Address 8 -----→ | Z | 22 ←----- | $\overline{AS}$ |

FIG. 26

LCD Driver (BCC25) Pin Connect To
MMZ8 Bus Pin Configuration
End View - Edge Card Connector
(signals not used on this board are in parentheses)

```
(- 12 Volts)      ----- A  [ ] 1  ----- +5 Volts
(+ 12 Volts)      ----- B  [ ] 2  ----- Ground
Reset             --------- C  [ ] 3  ----- (No Connection)
(No Connection)   ---- D  [ ] 4  ----- Address/Data 3
(Timer 0 Input)   ---- E  [ ] 5  ----- Address/Data 4
RD                --------- F  [ ] 6  ----- Address/Data 5
(Timer 1 Input)   ---- H  [ ] 7  ----- Address/Data 6
PSEN              --------- J  [ ] 8  ----- Address/Data 7
(Timer 2 Input)   ---- K  [ ] 9  ----- Address/Data 0
(Timer 2 Trigger) --- L  [ ] 10 ----- Address/Data 1
(TTL Serial Output) -- M  [ ] 11 ----- Address/Data 2
(TTL Serial Input)  -- N  [ ] 12 ----- (PW Modulator)
Int 0 - DMA Request -- P  [ ] 13 ----- Int 1
(DMA Acknowledge)   --- R  [ ] 14 ----- (Prog Enable)
Address 15        ------- S  [ ] 15 ----- (Program Pulse)
Address 14        ------- T  [ ] 16 ----- (No Connection)
Address 13        ------- U  [ ] 17 ----- (No Connection)
Address 12        ------- V  [ ] 18 ----- (No Connection)
Address 11        ------- W  [ ] 19 ----- (No Connection)
Address 10        ------- X  [ ] 20 ----- RD/WR
Address 9         ------- Y  [ ] 21 ----- DS
Address 8         ------- Z  [ ] 22 ----- AS
```

FIG. 26A

Console Serial Connector
(DB-258 RS-232 Connector – Top View)

```
No Connection  - - - - ->  1           14  <- - - - -  No Connection
Console Input  - - - - ->  2           15  <- - - - -  No Connection
Console Output - - - ->  3             16  <- - - - -  No Connection
No Connection  - - - - ->  4           17  <- - - - -  No Connection
Pull Up to +12 Volts ->  5             18  <- - - - -  No Connection
Pull Up to +12 Volts ->  6             19  <- - - - -  No Connection
Ground - - - - - - - ->  7             20  <- - - - -  No Connection
Pull Up to +12 Vdc - ->  8             21  <- - - - -  No Connection
No Connection  - - - ->  9             22  <- - - - -  No Connection
No Connection  - - - - -> 10           23  <- - - - -  No Connection
No Connection  - - - - -> 11           24  <- - - - -  No Connection
No Connection  - - - - -> 12           25  <- - - - -  No Connection
No Connection      - - -> 13
```

FIG. 27

Serial Printer Connector
(2 x 10 Pin Berg Header - Top View)

| Left Label | Pin | | Pin | Right Label |
|---|---|---|---|---|
| No Connection → | 1 | · · | 14 | ← No Connection |
| Aux Serial Out → | 2 | · · | 15 | ← No Connection |
| No Connection → | 3 | · · | 16 | ← No Connection |
| No Connection → | 4 | · · | 17 | ← No Connection |
| Pull Up to +12 Vdc → | 5 | · · | 18 | ← No Connection |
| No Connection → | 6 | · · | 19 | ← No Connection |
| Ground → | 7 | · · | 20 | ← Pull Up to +12 Vdc |
| No Connection → | 8 | · · | 21 | ← No Connection |
| No Connection → | 9 | · · | 22 | ← No Connection |
| No Connection → | 10 | · · | 23 | ← No Connection |

FIG. 28

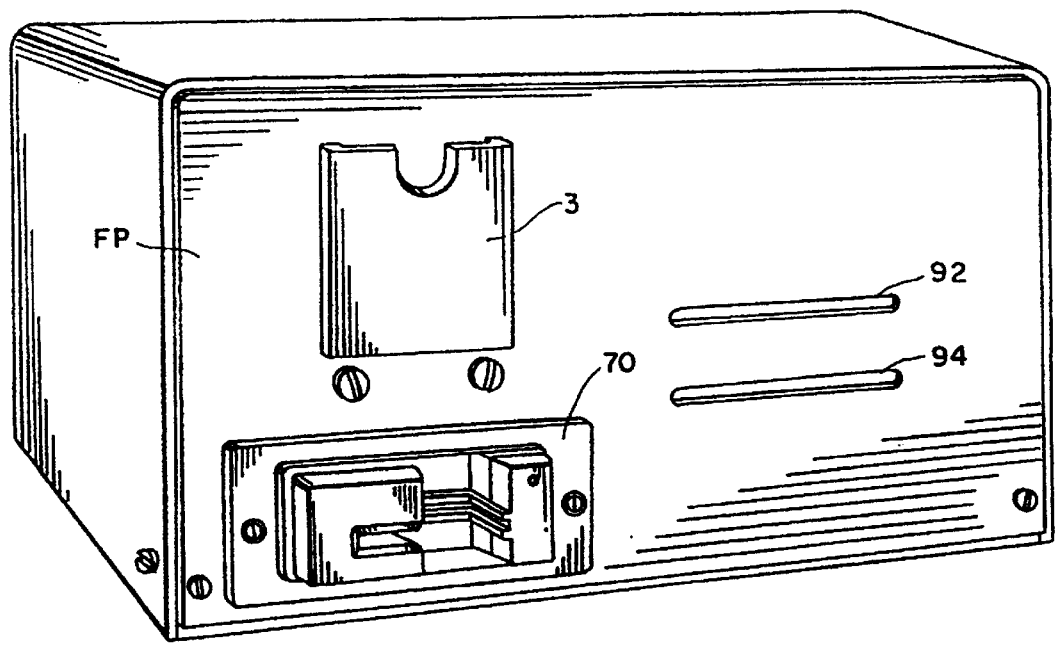
FIG. 31
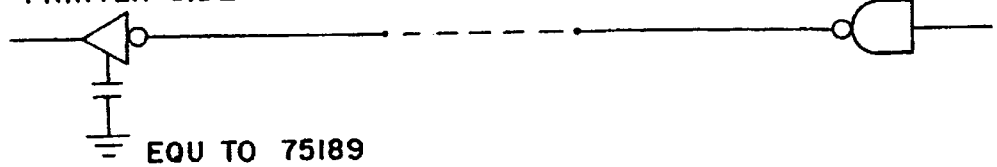
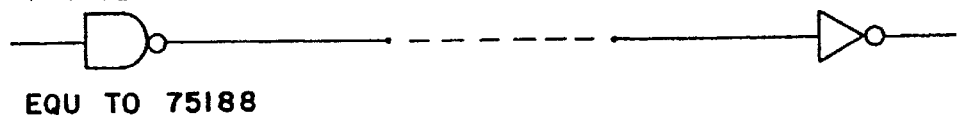
FIG. 32

NON-MINUTIAE AUTOMATIC FINGERPRINT IDENTIFICATION SYSTEM AND METHODS

This is a continuation of application Ser. No. 08/035,483, filed Mar. 22, 1993 now U.S. Pat. No. 5,363,453 which is a Continuation of Ser. No. 07/430,421, Filed Nov. 2, 1989, now abandoned.

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

BACKGROUND OF THE INVENTION

The invention system and related methods are directed to the automatic identification of fingerprints by video scanning and digitizing analysis of the scanned fingerprint, and to the general field of verification of the identity of a person to be identified, such verification being accomplished by comparing a non-minutiae digitized numeric identifier indicative of a fingerprint of a person to be identified with a numeric identifier recorded within the confines of a portable personnel identification means, personal to the person to be identified, which identification means can be of numerous kinds such as a retail credit card, a smart card, or others as set forth hereinafter. The numeric identifier of such portable personnel identification means is previously derived in accordance with the teachings of the present invention and then recorded within the identification means to enable identity verification, accomplished by comparison.

It is most desirable to have automatic means and methods for identifying human beings. Millions of individuals are checked on a daily basis by cumbersome and unreliable methods in banks, retail stores, classified areas, security environments, and by law enforcement officials. The problem of verifying the identity of an individual to a personnel identification card means held and offered as proof of identification by such individual, is one of the most common faced in the everyday duties of commerce, industry and government. Present day fingerprint verification methods are too time consuming and cumbersome to be expediently implemented into the civilian and military affairs of today's society. What is clearly needed is a means of, and methods for, providing automatic, rapid and positive verification of a person's identification.

The system invention, and the inventive methods utilized therein and related thereto, satisfy this long felt need for methods and means for providing automatic verifiable identification of an individual submitting him or herself for identification for the purpose of: retail credit card purchases, authorized entry, check cashing, obtaining a driver's license, showing proof of age via a driver's license, verification of the identity of a holder of a passport, etc.

A further great need is the development of such a system and methods for providing a verifiable fingerprint identifier which is most applicable to and recordable within a magnetic-stripe of a portable personnel identification card means, such as a magnetic stripe of a credit card. The least number of bytes within a verifiable fingerprint identifier, known to the inventors of the present invention, is a 400 byte numeric identifier developed by FINGERMATRIX. This known development is not at all applicable to a portable personnel identification card of the magnetic-stripe type for reasons well known to those skilled in this art.

The presently disclosed system invention and the inventive methods thereof fully satisfy this further need by providing a verifiable non-minutiae fingerprint identifier having but 24 bytes of fingerprint identification data which affords recordability to magnetic-stripe identification cards.

The invention includes the actual taking of an individual's fingerprint via an inkless means each time an identification is to be made. The print can be taken of any digit of a person, i.e. index finger or thumb or toe, and the image of a digitprint is video scanned to produce image data which is digitized in accordance with the teachings of the invention to produce a non-minutiae digitized numerical identifier indicative of the digit print image, and this digitized numerical identifier is compared with a numerical identifier read from an identification card means identifying the person to be identified, to verify the identity of that person.

Various other objects and advantages of the invention methods and system will be apparent from that set forth hereinafter, and some of the specific objectives of the invention are recited hereinbelow.

OBJECTS OF THE INVENTION

It is an object of the invention to provide a biometric means for comparing the fingerprint of an individual whereby a rapid and highly fraud-proof check may be made.

It is another object of the invention to make the fingerprint image expediently available for immediate analysis to render approval or disapproval of the identity of a given person from whom the fingerprint is taken.

It is a general objective of the invention to provide a system and related methods by which an individual fingerprint may be video-scanned and digitized in such a manner that the procedure produces a numeric identifier uniquely related to the pattern of the fingerprint, this identifier consisting of a specified number of digits or bytes to identify the fingerprint against an actual fingerprint of an individual at the time positive identification is required.

It is a specific object of the invention to provide a non-minutiae digitized numerical identifier having less than 400 bytes of fingerprint identification data, and in particular, a verifiable identifier having less than 100 bytes of fingerprint identification data for application to mag-stripe personnel identification cards, as exemplified by the provision disclosed herein of a non-minutiae digitized numerical identifier having 24 bytes of fingerprint identification data.

It is yet another object of the invention to provide means by which a fingerprint image format may be positioned automatically in relation to the video scanning means, in such a way that the position is predetermined and will be reestablished each time that a print format means is placed before the video scanner, thus insuring that a subsequent scanning operation will always produce consistent and reliable field of scan results.

It is still another object of the invention to provide means and methods for selectively analyzing, electronically, on a non-minutiae basis, a plurality of different fingerprint image parts of the stored fingerprint image data and computing a ridge count for each of the plurality of fingerprint image parts, and then compiling a data matrix comprised of a plurality of ridge counts computed for the plurality of fingerprint image parts to provide a non-minutiae digitized numerical identifier indicative of the image of a fingerprint of a person to be identified.

It is still another object of the invention to provide a predetermined sequence of selectively analyzing, electronically, on a non-minutiae basis, a plurality of different fingerprint image parts of the stored fingerprint image data, which fingerprint pattern parts exist within a fingerprint identity window defined by the invention.

It is yet still another object of the invention to provide a non-minutiae digitized numerical identifier indicative of an image of a fingerprint of a person to be identified, which is recordable within the magnetic stripe of a credit card personal to the person and therefore, the present invention facilitates the use of a credit card as a verifiable identification card for entitling the user to certain services such as charged purchases and check cashing.

It is even a further object of the invention to provide a fingerprint identification system and inventive methods utilized therein, which can be completely software controlled and automated to eliminate the possibility of human error, to increase the reliability of the identification being made and to eliminate any constant supervision as usually required with conventional identification procedures. The invention, by utilizing an unchanging characteristic of an individual for making an identification, is not subject to obsolescence and at the same time may be constructed at various levels of sophistication depending on the degree of security of reliability which is desired. The system can be made an integral part of other systems in which information about individuals is taken and recorded and the system can be so constructed with controls that provide for immediate revocation of the privileges of benefits given any individual identified in the system.

It is also another object of the invention to provide a method for the automatic non-minutiae identification of a fingerprint of a person to be identified which includes a method for determining the location of the fingerprint image data stored in a memory means with the whitespace data produced by scanning an image of a fingerprint, and to define a fingerprint or digitprint identity window so as to define a predetermined "area of analysis", which area is defined depending on the specific needs of the end-user application, and with respect to a predetermined "window-size", to enable defining the dimensional area of the fingerprint identity window.

The foregoing and other objects, features and advantages of the invention will be apparent from the following more detailed description of preferred embodiments and methods of the invention, as illustrated in the accompanying drawings.

BRIEF DESCRIPTION OF THE DRAWINGS

FIGS. 7A, 8A, 9A, and 10A, illustrate the values computed in reference to a fingerprint image produced on an inkless framed format means; and FIGS. 7B, 8B, 9B and 10B provide illustrations of how the respective values are determined from the performance of their respective method steps which are performed on the digital fingerprint image and whitespace data stored in the memory means of the video digitizer, in accordance with the teachings of the present invention.

FIG. 25 illustrates the System Bus Pinout diagram for interconnection of the digitizer 10 to the MMZ8 edge connector Z8.

FIG. 26 illustrates the MMZ8 bus pin configuration interconnections of processor 20 and the Z8 edge connector via J4.

FIG. 26A illustrates the interconnections of LCD Driver 30 with Z8.

FIG. 27 illustrates a console serial connector J1 which is utilized to interconnect the PPI/MS Reader 60 with processor 20.

FIG. 28 illustrates the serial printer connector J2 which is utilized to interconnect the processor 20 with the printer 50.

FIG. 31 illustrates a third embodiment of the system invention employed in an application pertaining to check cashing-personnel identity verification of check payee, which embodiment incorporates the use of PPI/MS Reader 60 and printer means 50.

FIG. 32 illustrates the connection of printer 50 to the processor 20.

DEFINITIONS

Figure 1B:
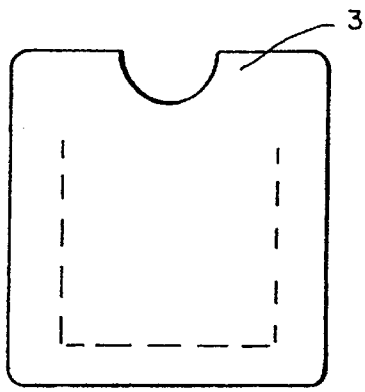
FIG. 1B shows the inkless framed format holder means which is mounted on the face of the system housing.

It is well known that fingerprints contain specific features, called minutiae, which are unique and allow identification of people by their fingerprints or even a toe print. By definition, a minutiae is either: (1) a bifurcation, which is the location where a given line forks into different lines; or (2) a ridge ending. Minutiae are usually recorded with three, coordinates: two coordinates "x" and "y" for the position of the minutiae relative to a coordinate system: and one coordinate "a", which is an angle representing the average direction of the lines around the minutiae point.

In contrast, the present invention methods and system are "non-minutiae" based and either provide or utilize a non-minutiae digitized numerical identifier which is uniquely related to the pattern of a fingerprint it identifies. The non-minutiae digitized numerical identifier is provided by selectively analyzing electronically, on a non-minutiae basis, different parts of a fingerprint and deriving from each part a byte numeric which is directly related to the ridge count computed for that part. This non-minutiae digitized numerical identifier can also be described as a "verification string".

The term "digitizing" is used herein to refer to the process by which the non-minutiae digitized numerical identifier is derived by the respective invention methods disclosed herewith; and, the term "digitized" is used herein to identify the non-minutiae numerical identifier derived by such process.

The "ridge counts" are computed by analyzing or examining selected horizontal and vertical and diagonal memory data lines of the fingerprint identity window defined by the present invention, and counting the number of greylevel shifts from "white" (greylevels 13, 14 or 15) to "black" (greylevels 0 through 12).

The video digitizer of the system invention is the means employed for converting the video scanned fingerprint image data (FID) and whitespace data into digital data to generate within its memory a digitalized picture of that scanned by the video scanner, i.e. the inkless format providing an image of a fingerprint of a person to be identified; but, it is the software-controlled processor means of the invention which functions to selectively analyze the digital data to provide a digitized numerical identifier indicative of the fingerprint image.

The present invention discloses an inventive method step termed "image framing" wherein, prior to selectively analyzing different parts of the fingerprint image data and prior to defining a fingerprint identity window, the fingerprint image and whitespace digital data stored in an addressable memory means (RAM), located in the video digitizer, are framed to a predetermined dimension, and the location of the fingerprint image data stored in this memory means with whitespace data is determined by determining: (1) X-START and X-END values to indicate the start and the end of the fingerprint image data along the X-axis, and (2) Y-START and Y-END values to indicate the start and end of the fingerprint image data along the Y-axis. The "image framing" invention method also includes an "image frame sizing" step which essentially frames the digital fingerprint and whitespace image data contained in memory.

The "fingerprint identity window" defined by the present invention is the "area of analysis" defined within the fingerprint image data stored in memory. It is this fingerprint identity window which is selectively scanned and analyzed in accordance with the teachings of the present invention, to provide a non-minutiae digitized numerical identifier indicative of the fingerprint image data of a fingerprint of a person to be identified. The "fingerprint identity window" is defined depending on the specific needs of the end-user application, and is set by determining a "window-size".

The purpose of the "verification string" is to provide a tailorable degree of certainty into the comparison of encoded data on i.e., the magnetic stripe of a credit card, or other article presented by an individual used as a personal identification means, and the individual's fingerprint image.

This "verification string" can be variable in size, depending on multiple factors. The invention affords the provision of a verification string (or digitized numerical identifier) which has less than 400 bytes of fingerprint identification data, or one having less than 100 bytes of FID as applicable to a magnetic stripe credit card or a smart card or other personal identification card means, or, in particular, an identifier having only 24 bytes of FID which as disclosed in a preferred method and embodiment of the present invention is uniquely applicable to the magnetic stripe of a credit card.

An "element" is a calculated value, generated by the end-user application.

A first factor is the size of the "window" in which image analysis is performed. The larger the window, the more verification data can be generated for comparison purposes. Since the "window" is variable depending on end-user applications, the size of the verification string can vary as well. Thus, it is reasonable to say that increasing the "window-size" used in verification string generation presents the opportunity to increase the number of elements which comprise the verification string.

A second factor is the formulas or calculations used to generate or calculate the verification string. The calculations performed to generate the verification string can vary from one end-user application to another. Any mathematical formula or statistical computation based on ridge counts, whether individually or as a sum, can be used as an element in the verification string data matrix which is compiled.

Both of the above scenarios address the flexibility of the verification string size in designing end-user applications with varied degrees of verification confidence. Of course, different applications might have the same number of verification string elements, yet comprise of entirely different formulas used to generate that data. In other words, two end-user applications may comprise verification strings having a different total number of elements, and the applications may generate each element of its verification string differently.

Lastly, the positioning of each element within the verification string could be different from one application to another. For instance, one application might use Yc (Y Center Line Count) as a value for the seventh element of the verification string, as disclosed herein, and yet another application may use the same value in another element of its verification string.

DETAILED DESCRIPTION OF INVENTION METHODS

Figure 1A:
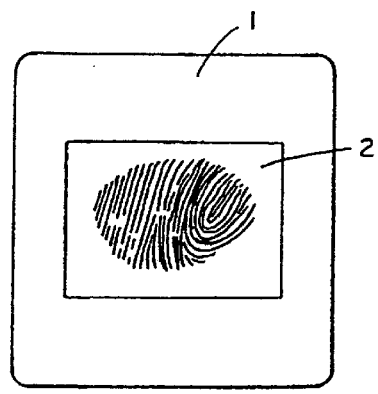
FIG. 1A shows an inkless framed format having produced thereon an image of a fingerprint.

A preferred form of the present invention system and methods combinatively utilize an inkless media for the purpose of taking or providing an image of a fingerprint or digitprint. An image of such print is produced by placing a digit of the person to be identified within a 2"×2" framed format 1 as shown in FIG. 1A, which contains a treated material which when touched by a finger, utilizing an inkless process, causes immediate development of an image of a fingerprint of such finger in a black and white appearance, to provide a good quality scannable image of a fingerprint. The use of this inkless means for taking a fingerprint of a person to be identified overcomes the disadvantages of conventional fingerprint taking techniques. Of course, it is within the scope of the present invention to be applicable to video scan a fingerprint image imprinted upon other media, or by other methods.

After the fingerprint has been taken, the inkless framed format 1 is placed within a format holder 3 which is mounted on the face plate of the system housing. The placement of the inkless framed format within the format holder 3 is illustrated in FIG. 1B.

Figure 2:
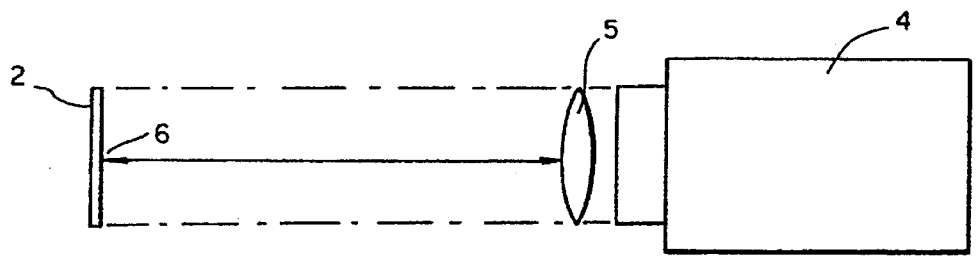
FIG. 2 shows the predetermined position orientation of a video scanning camera and a 16 mm lens to the center of an inkless framed format positioned within the framed format holder means.
Figure 3:
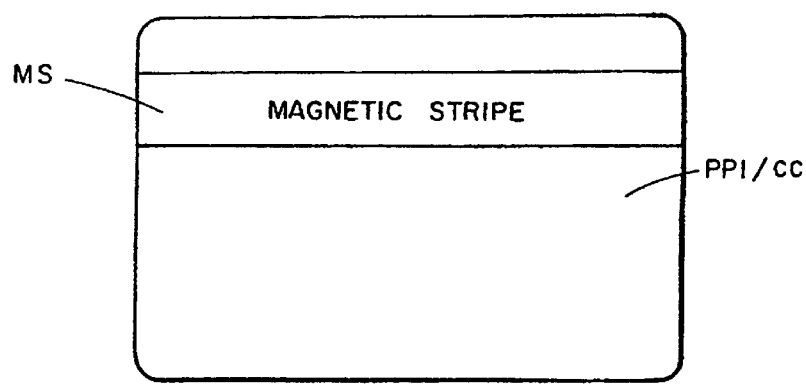
FIG. 3 shows a portable personnel identification card of the magnetic-stripe kind.
Figure 4:
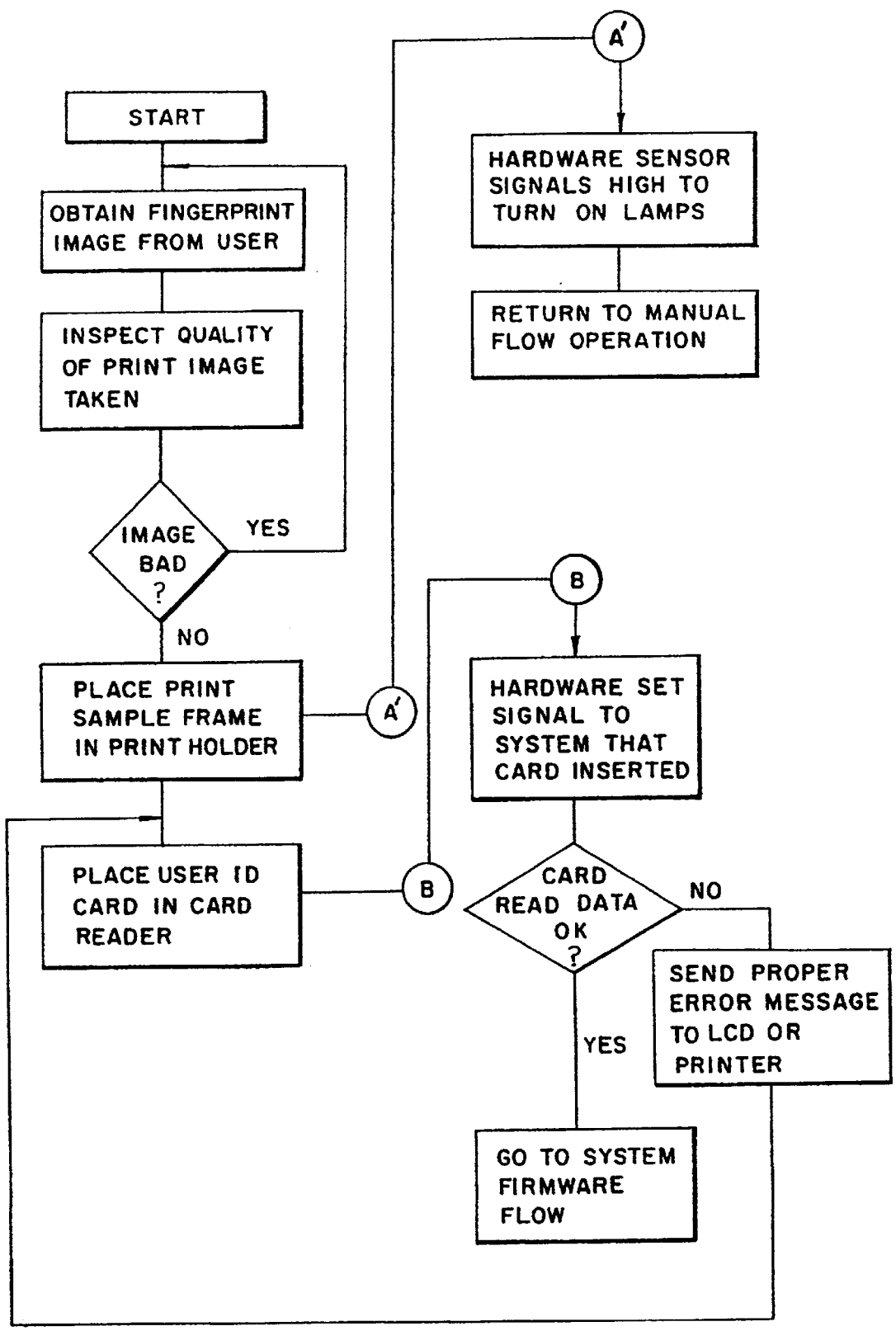
FIG. 4 is a flow diagram of the system manual and hardware flow of the present invention.
Figure 5:
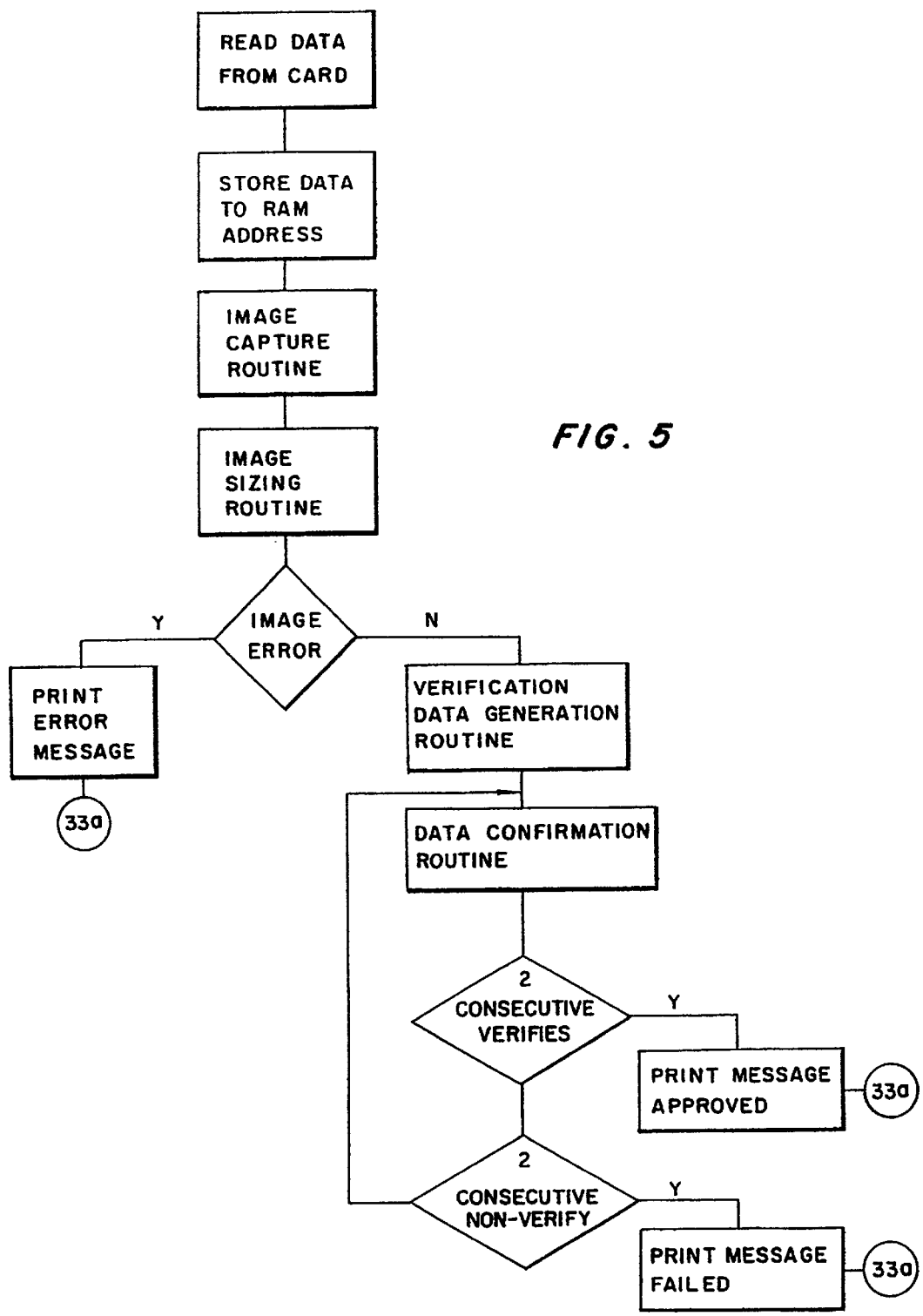
FIG. 5 is a flow diagram of the software process of fingerprint identification verification of the present invention.

FIG. 2 shows the predetermined position orientation of a video scanning camera 4 and a 16 mm lens 5 associated therewith, to the center of the inkless framed format when it is positioned within the format holder. The center 6 is the center of the inkless media 2 bearing the fingerprint image. A preferred predetermined distance of 2½ inches is set between the center 6 and the face of lens 5.

Accordingly, this provides means by which a fingerprint may be positioned automatically in relation to a video scanning system, in such a way that the position is unique and will be reestablished each time that the framed format 1 is placed within the format holder and thus within the field of scan of the video scanner, to insure that any subsequent scanning operation will always produce proper and desirable results. The use of the inkless fingerprint media for taking the person's fingerprint without requiring the direct application of ink to the person's finger, and under controlled conditions, affords that the person's print may be repeatedly produced with the same clarity and detail, thus facilitating an accurate comparison between prints.

After the fingerprint has been taken on the inkless means of the framed format, the framed format 1 is placed within the holder 3 with the fingerprint image facing the housing face plate and towards the field of view of the video scanner. It is to be noted that in an effort to diminish background reflection of light from the framed format 1, the framed portion has been blackened, as shown in, for example, FIG. 7A.

Figure 6A:
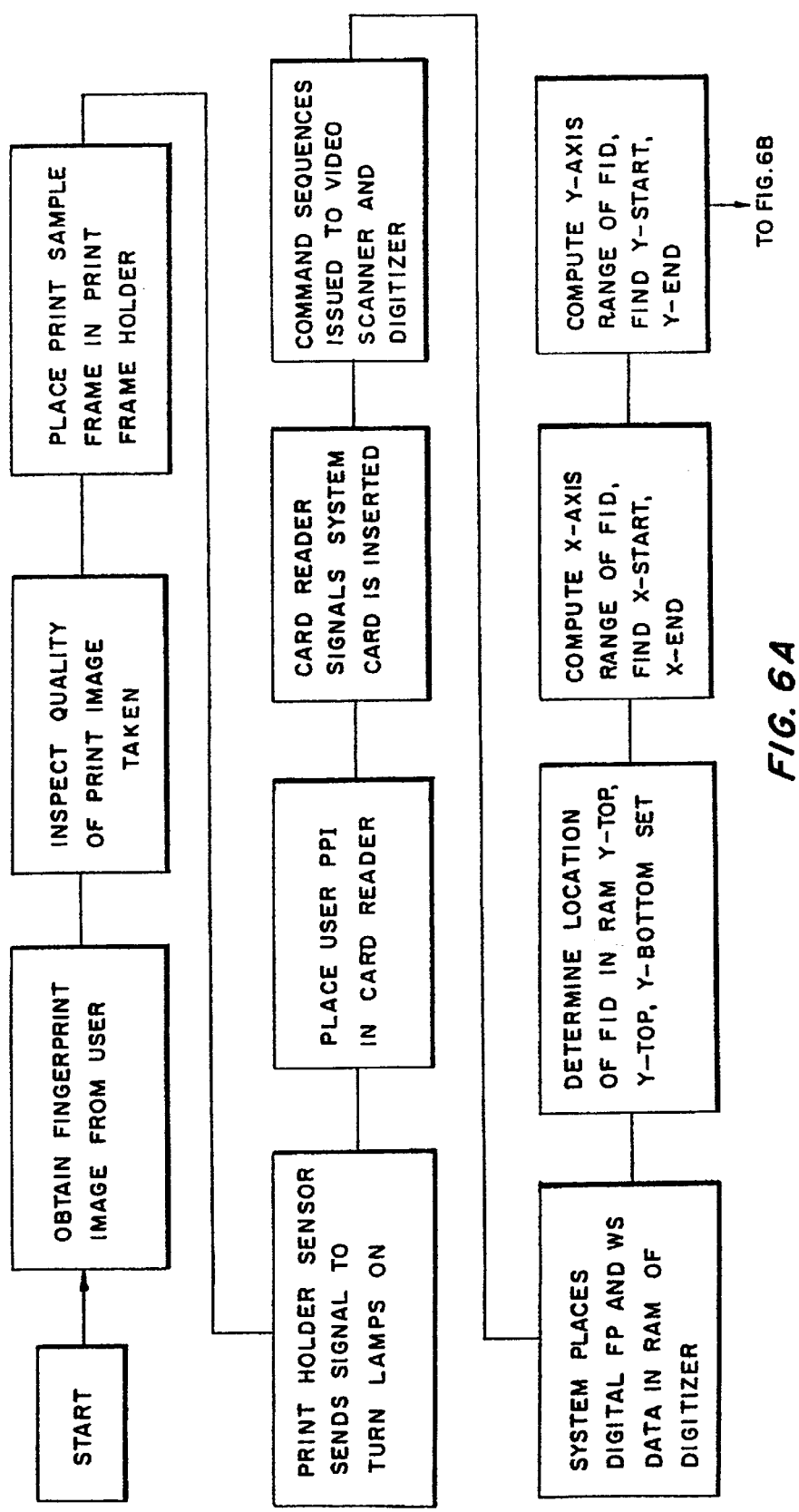
FIGS. 6A and 6B is a combined flow chart diagram of the manual, firmware and software process flow of the present invention.
Figure 6B:
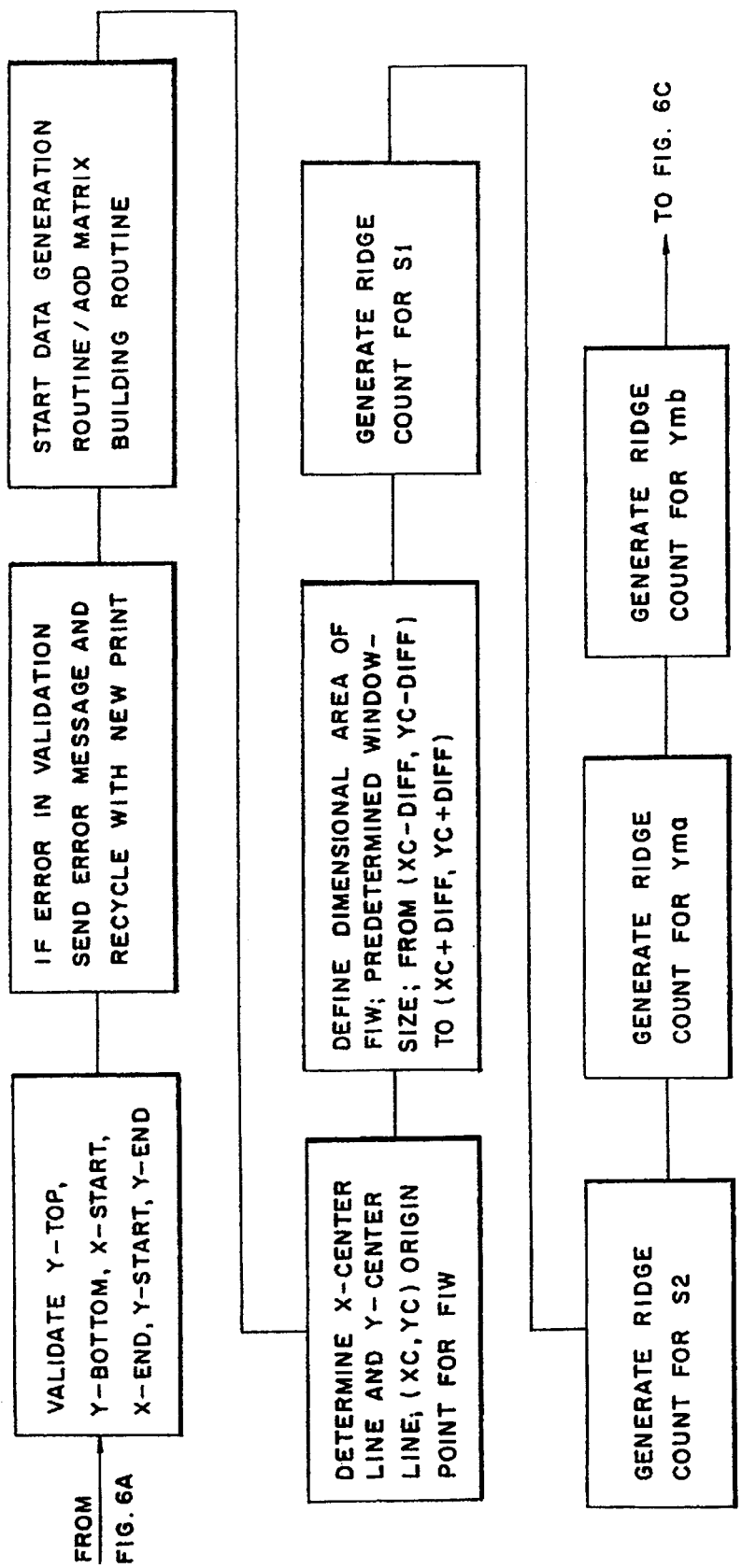
Figure 6C:
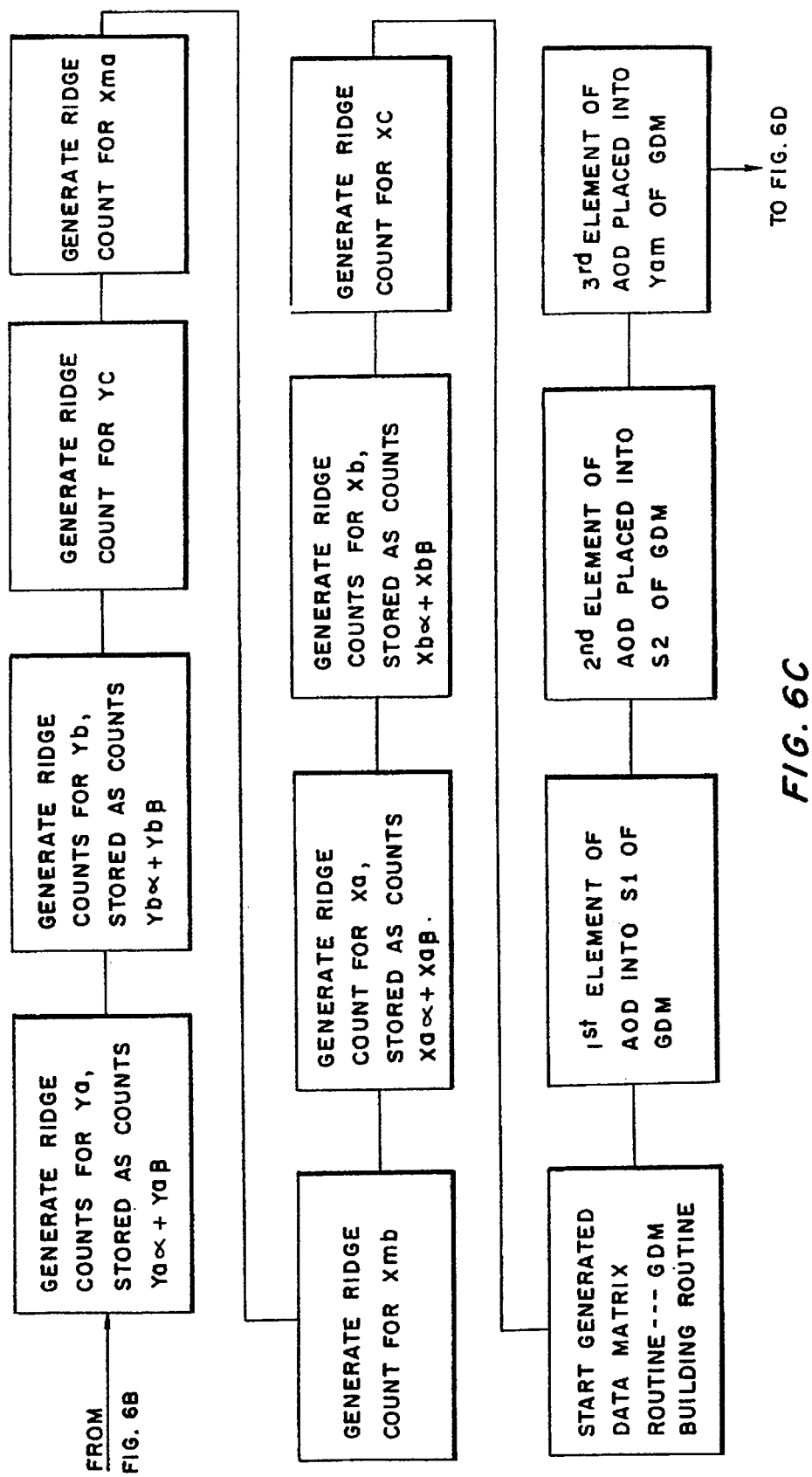
Figure 6D:
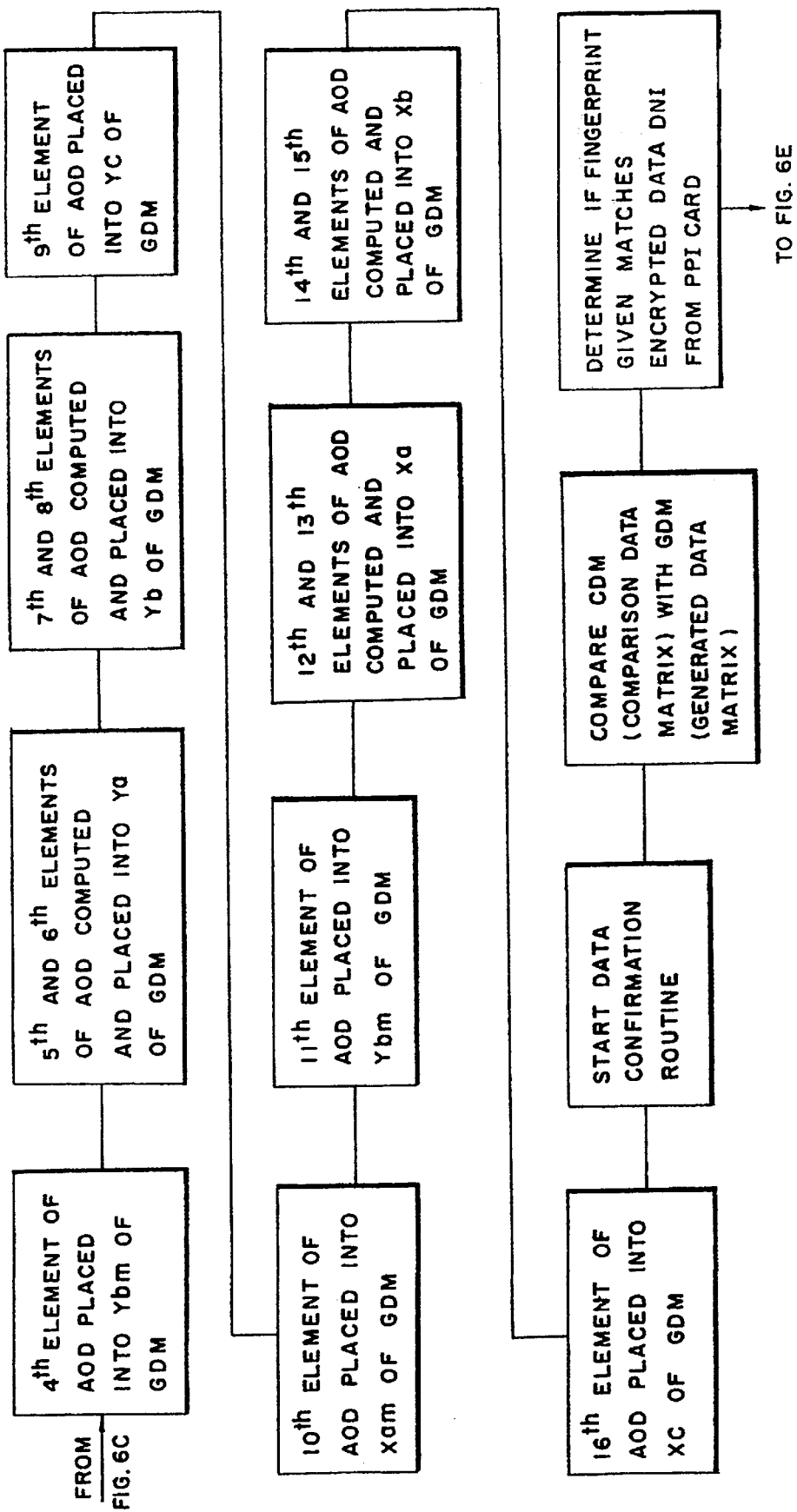
Figure 6E:
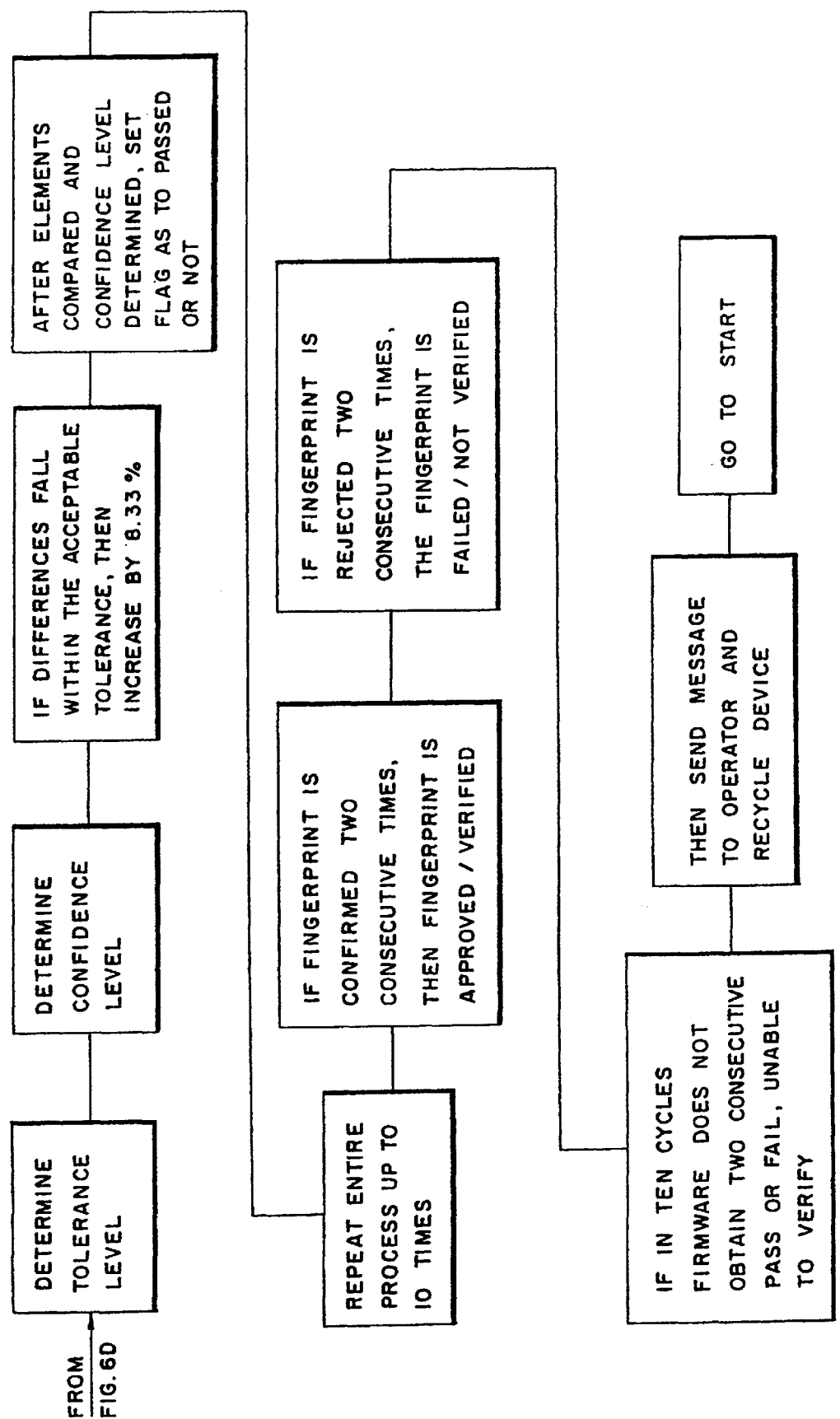

As shown in the FIG. 6A flow chart, in operation, after the fingerprint format is placed in the format holder and an identification card means is placed in a card reader, system command sequences are issued to the video scanner and the digitizer to commence and complete the scanning and digitizer functions.

Thus, the image of a fingerprint is video scanned to produce image data which is provided to a digitizer which converts the image data into digital image data which is stored in an addressable memory means (RAM) of the digitizer. To accomplish this, a sequence of commands are issued to the digitizer's "command port". This command sequence is specific to each end-user application. After these commands are issued, the digital fingerprint image and whitespace data generated by the scanning procedure and contained in memory in the digitizer, is ready for analysis.

Firmware Process Overview—The controlling firmware of the invention system has several components, each of which perform a specific task which, when combined, provide a series of processes that will take a fingerprint sample and verify it against verification data to insure the authenticity of the provider of the sample. These processes include the following routines:

Comparison Data Retrieval Routine
Image Capture Routine
Image Sizing Routine
Algorithm Data Generation Routine
verification Data Generation Routine
Data Confirmation Routine Each of these routines are executed in sequence, and will be discussed in order. However, before the firmware verification process can commence, that set forth hereinabove must have been performed.

Comparison Data Retrieval Routine—This routine controls receipt of the Provider's verification data recorded on the identification card means, which is compared against data computed from the fingerprint sample to approve or fail the Provider's authenticity. The verification data could be encrypted and this will be discussed in a following disclosure section, along with an associated decryption function. The verification data (also termed "non-minutiae numerical identifier") recorded within the identification card means is read and stored in a 12 element array which is located in the processor of the invention system. This matrix has the same layout as the Generated Data Matrix which will be discussed subsequent to the following.

Figure 7A:
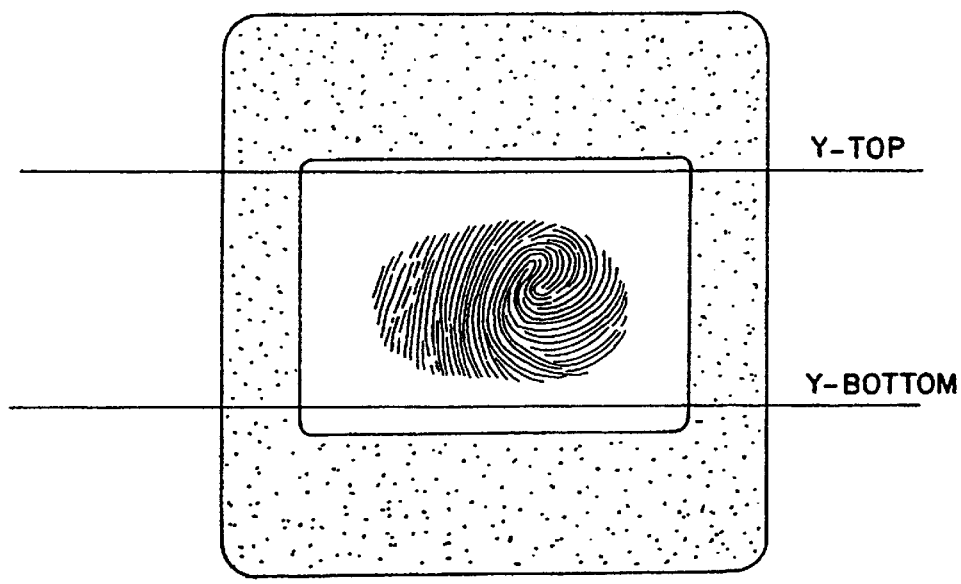
FIGS. 7A, 7B, 8A, 8B, 9A, 9B, 10A, and 10B jointly depict the Image Frame Sizing Routine of the invention, wherein the respective method steps are shown in two forms.
Figure 7B:
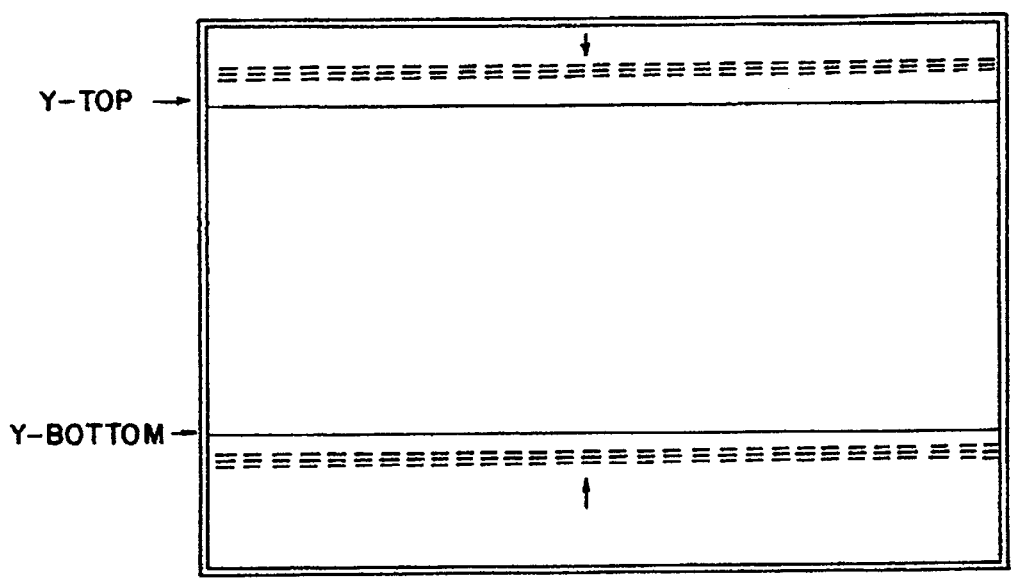
Figure 8A:
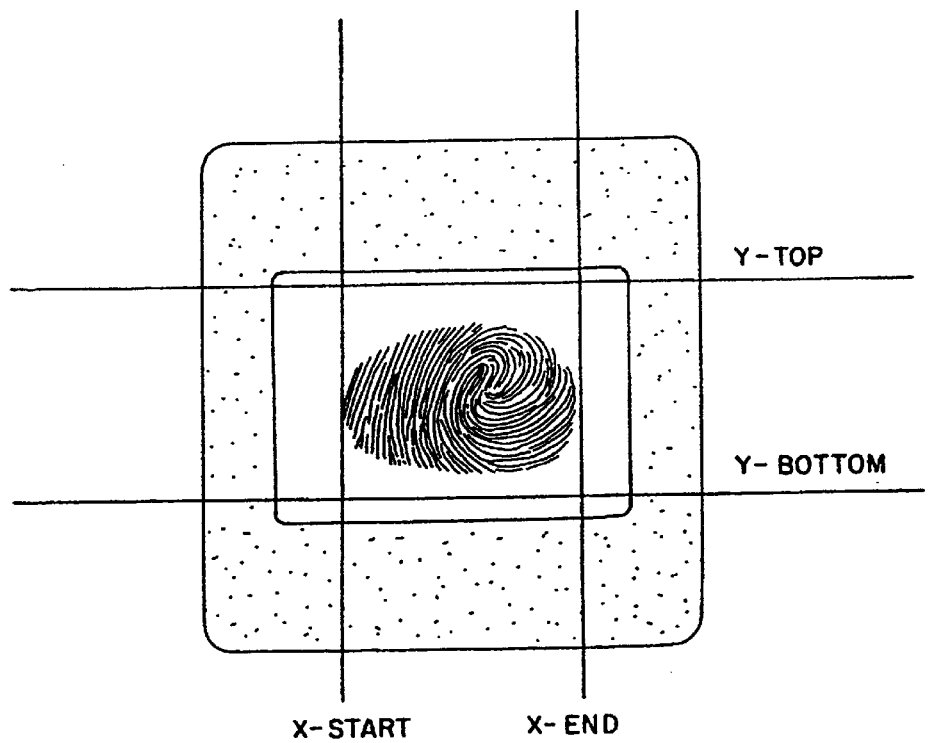
Figure 8B:
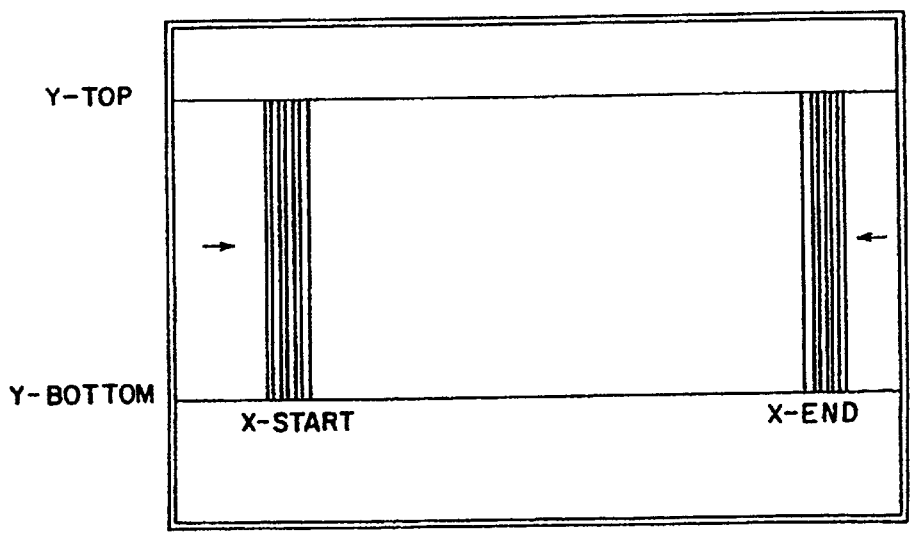

Image Frame Sizing Routine—This routine is generated subsequent to the Image Capture Routine which controls the operation of the video camera and the digitizer to capture the fingerprint image and whitespace data in memory. With reference to FIGS. 7A and 7B, this is accomplished as follows:

Note: "Whitespace" is defined as a greylevel equal to 13, 14, or 15.

a) Memory frame locations (128,Y), where $0 \leq Y \leq 255$ are inspected, when three consecutive rows of whitespace are found, Y-TOP is defined as the current Y-value: and b) Memory frame locations (128,Y), where $255 \geq Y \geq 0$ are inspected, when three consecutive rows of whitespace are found, Y-BOTTOM is defined as the current Y-value.

c) With respect to FIGS. 8A and 8B, once Y-TOP and Y-BOTTOM values are established, the X-Axis Range of the fingerprint image data needs to be computed. This is accomplished by scanning (i.e., examining) each column (vertical line) to find three consecutive columns of whitespace. Once three columns are found, the next column containing a greylevel other than whitespace (i.e., black) is considered to be part of the Image.

Figure 9A:
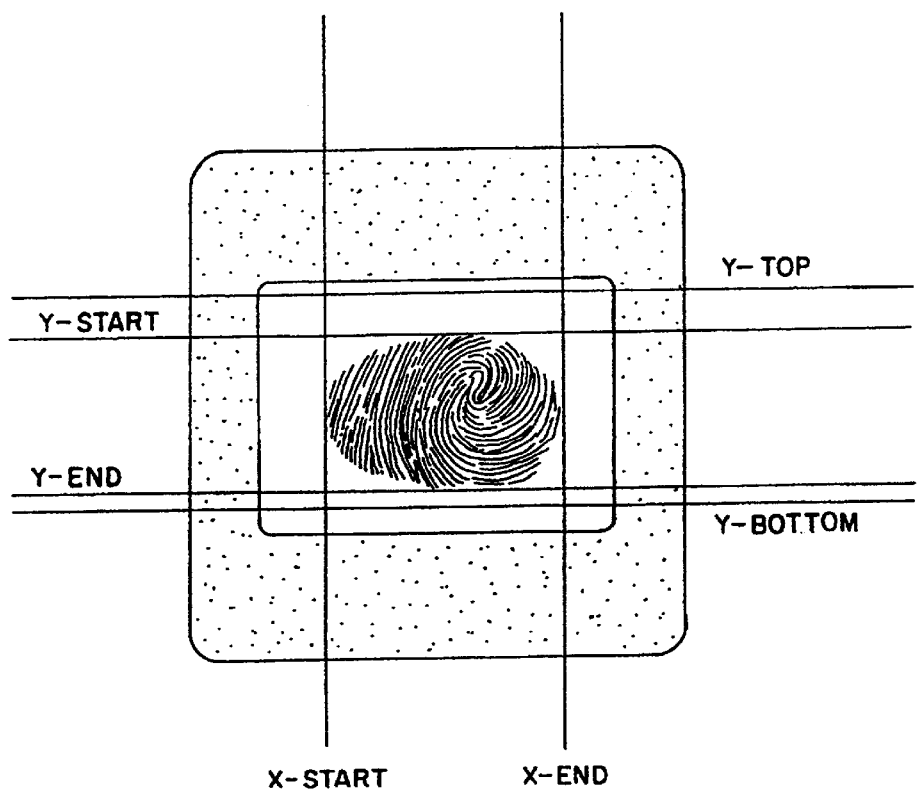
Figure 9B:
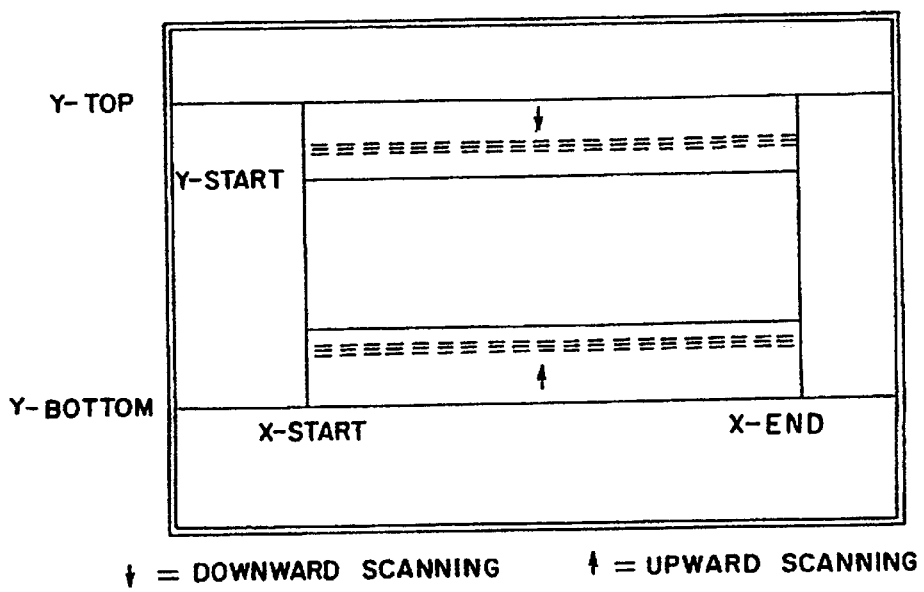

Two X-Axis values, X-START and X-END, need to be set, to indicate the start and end memory data locations of the Image on the X-Axis, respectively. X-START is determined by scanning Frame Locations (X,Y), where $0 \leq X \leq 255$ and Y-TOP$\leq$Y$\leq$Y-BOTTOM. This value indicates where the Image "starts" on the X-Axis. X-END is determined the same way, only reversing the X-Axis scan direction from $255 \geq X \geq 0$, to determine where the Image "Ends" on the X-axis.

d) With respect to FIGS. 9A and 9B, now that the X-Axis range has been computed, the Y-Axis range of the FID needs to be computed. This is accomplished in a method similar to that used for the X-Axis Range.

Each row (horizontal line) is scanned, and, syncing on three consecutive whitespace rows, the next row that contains a greylevel other than whitespace is considered to be part of the image.

Figure 10A:
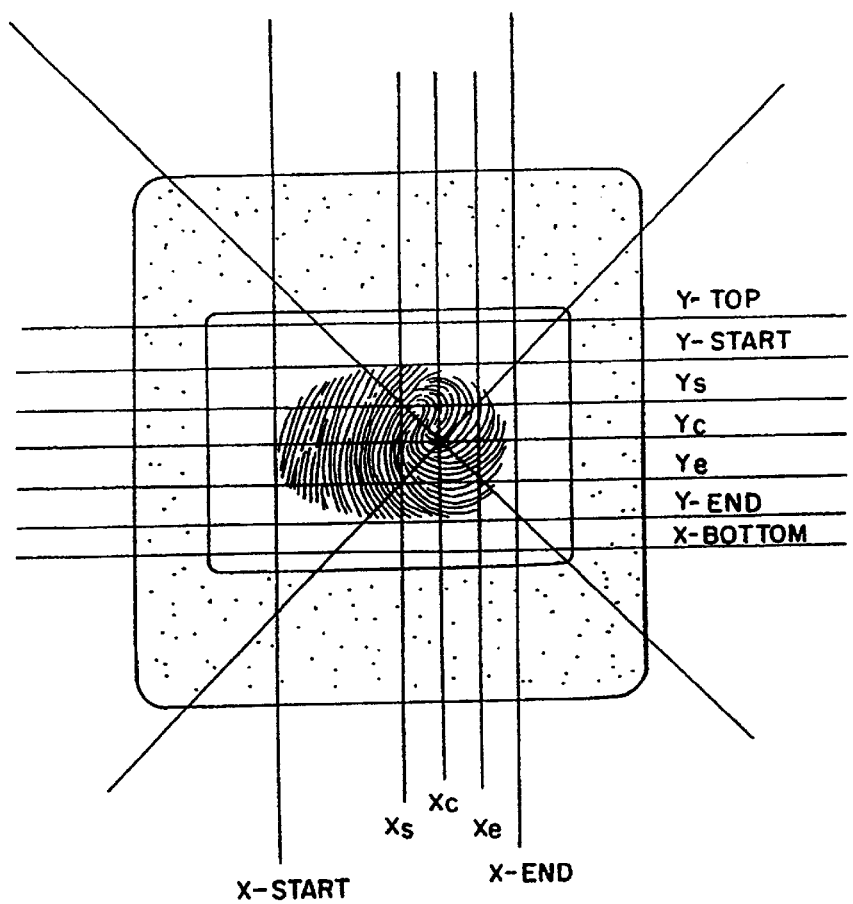
Figure 10B:
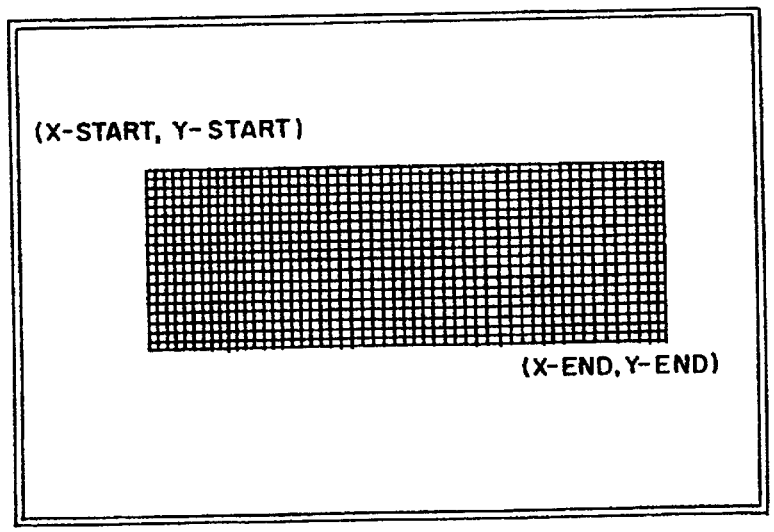

Two Y-Axis values, Y-START and Y-END, need to be set, to indicate the start and end memory data locations of the Image on the Y-Axis, respectively. Y-START is determined by scanning Frame Locations (X,Y), where X-START≤X≤X-END and Y-TOP≤Y≤Y-BOTTOM. Y-END is determined in similar fashion, only different being that the direction of scan along the Y-Axis is from Y-BOTTOM≥Y≥Y-TOP.

e) With respect to FIGS. 10A and 10B, all values generated must be validated to insure that an accurate image has been scanned and sized. If any of the following conditions fail, a "Poor Image Quality" error is generated, and the system recycles.

The conditions which will cause this error are:
i. Y-BOTTOM≤Y-TOP
ii. X-END≤X-START
iii. Y-END≤Y-START If any of the above conditions are true, then the fingerprint sample provided to the Digitizer should be discarded and a new sample taken.

If none of the above error conditions exist, then the fingerprint sample is considered to have been accurately scanned and sized. The area within the memory frame where the fingerprint image data exists can be illustrated as shown in FIG. 10B.

Fingerprint Identity Window "Area of Analysis"

Prior to calling the mainline routine for the algorithm data generation routine (ADGR), locations must be set to describe the "window" within the fingerprint image data, stored in the memory frame, which is going to be analyzed. This "window" is a box, determined around an origin point defined as (XC,YC). XC and YC, or more appropriately called X-Center Line and Y-Center Line, are determined from values generated in the Image Sizing Routine, according to the following formulas:

$$XC = X\text{-END} - (X\text{-END} - X\text{-START})/3$$

$$YC = Y\text{-END} - (Y\text{-END} - Y\text{-START})/2$$

The difference between the two calculations is based upon the knowledge that the lower portion of a person's fingerprint (i.e., the portion containing the whirl) will be located closer to X-END than X-START. Thus, the XC value should start in the rightmost third of the print (hence, the division by 3) as that is where the whirl is likely to exist in the digitalized image. YC is simply determined to be the standard Center Line between the two Y points on the frame's Y-Axis. Thus, assuming a print has been sized to exist from (50,50) to (200,150), (XC,YC) would be defined as (150, 100).

Once (XC,YC) has been established, the "area of analysis" can easily be defined to the ADGR mainline routine. This area is defined depending on the specific needs of the end-user application, and is set by determining a "window-size".

The "window-size" is always an odd number. The "area of analysis" is then defined as XC±DIFF and YC±DIFF. DIFF is computed with the following formula:

DIFF=½ (window-size−1)

So, if the "window-size" is 73, the "area of analysis" would be appropriately defined as (XC±36, YC±36), or, in our example above, from (114,64) to (186,136).

Accordingly, the dimensional area of the fingerprint identity window is defined by predetermining a window-size for the fingerprint identity window and defining its dimensional area as from (XC−DIFF, YC−DIFF) to (XC+DIFF, YC+DIFF) where DIFF=½ (window-size minus 1), wherein (XC−DIFF)=Xs, (YC−DIFF)=Ys, (XC+DIFF)=Xe, and (YC+DIFF)=Ye.

In addition to the X and Y Center Line values, there are four other variables which are used in Algorithm computations and these values are set forth hereinbelow and have been recited in connection with determining the dimensional area of the fingerprint identity window:

| Description: | Symbol: | Value: |
|---|---|---|
| Window X-Axis Start | Xs | XC − DIFF |
| Window X-Axis End | Xe | Xc + DIFF |
| Window Y-Axis Start | Ys | YC − DIFF |
| Window Y-Axis End | Ye | YC + DIFF |

Figure 11A:
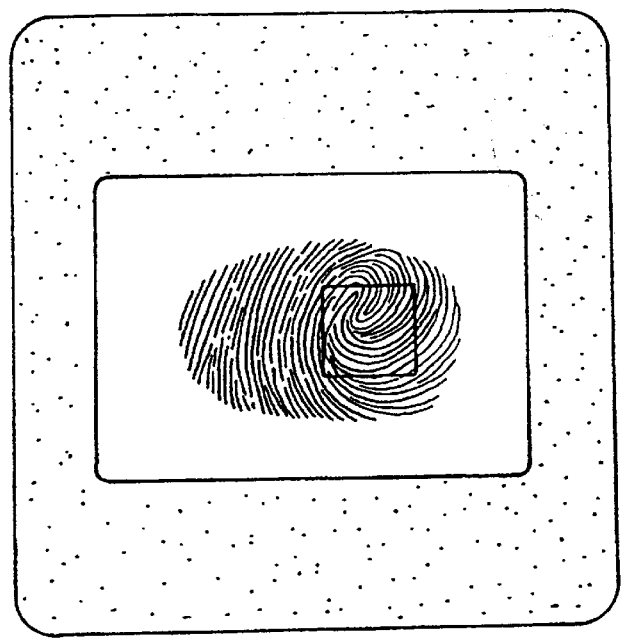
FIGS. 11A and 11B depict in a fashion similar to FIGS. 7–10, a method step of the Algorithm Data Generation Routine, wherein the inventive methods of defining a fingerprint identity window and determining the dimensional area of such window, are accomplished.
Figure 11B:
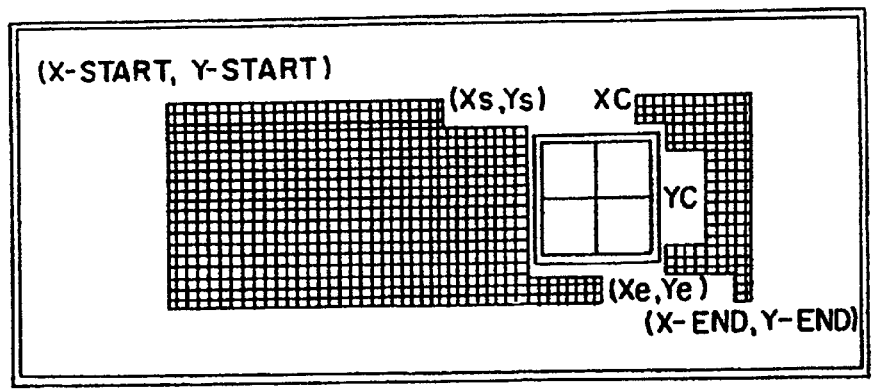

Once the proper values have been set, the "area of analysis" can be illustrated as shown in FIGS. 11A and 11B.

Algorithm Data Generation Routine—The Algorithm Data Generation Routine (ADGR) consists of a series of modules designed to generate 16 ridge-count values to be used in the computation of the Generated Data Matrix. The processing for each of these values will be discussed after the following presentation:

| Algorithm Output Data | | |
|---|---|---|
| Key: | S1 | — Diagonal \ Absolute Count |
| | S2 | — Diagonal / Absolute Count |
| | Yam | — Y-Axis A-Range Maximum Absolute Count |
| | Ybm | — Y-Axis B-Range Maximum Absolute Count |
| | Yaα | — Y-Axis A-Range Average Count |
| | Yaβ | — Y-Axis A-Range Average Count |
| | Ybα | — Y-Axis B-Range Average Count |
| | Ybβ | — Y-Axis B-Range Average Count |
| | Yc | — Y-Axis Center Line Absolute Count |
| | Xam | — X-Axis A-Range Maximum Absolute Count |
| | Xbm | — X-Axis B-Range Maximum Absolute Count |
| | Xaα | — X-Axis A-Range Average Count |
| | Xaβ | — X-Axis A-Range Average Count |
| | Xbα | — X-Axis B-Range Average Count |
| | Xbβ | — X-Axis B-Range Average Count |
| | Xc | — X-Axis Center Line Absolute Count |

| Algorithm Output Data: | | | | | | | |
|---|---|---|---|---|---|---|---|
| 01 | 02 | 03 | 04 | 05 | 06 | 07 | 08 |
| S1 | S2 | Yam | Ybm | Yaα | Yaβ | Ybα | Ybβ |
| 09 | 10 | 11 | 12 | 13 | 14 | 15 | 16 |
| Yc | Xam | Xbm | Xaα | Xaβ | Xbα | Xbβ | Xc |

Ridge counts are generated by examining the horizontal and vertical lines set forth hereinbelow, and counting the number of greylevel shifts from "white" (greylevels 13, 14, or 15) to "black" (greylevels 0 through 12).

The computation of the counts for the values of the Algorithm Output Data will now be described.

Figure 12:
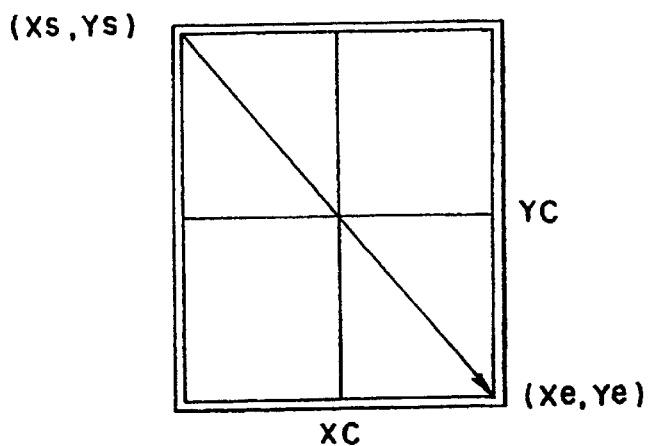
FIG. 12 illustrates the computation of count S1.

Value #1: S1; Diagonal\Absolute Count (FIG. 12)

This routine generates a count of ridges contained on the diagonal line drawn from point (Xs,Ys) to (Xe,Ye). Since the "window" is an absolute square, this relationship is a one-for-one increment along the X-Axis and Y-Axis, starting at Xs, and ending at Xe.

Figure 13:
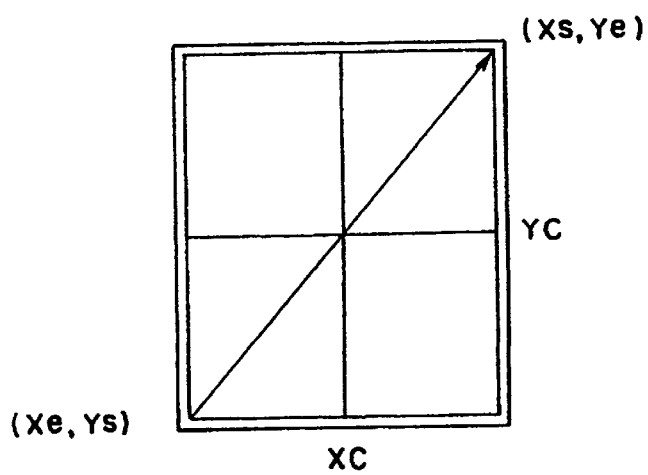
FIG. 13 illustrates the computation of count S2.

Value #2: S2; Diagonal/Absolute Count (FIG. 13)

This routine generates a count of ridges contained on the diagonal line drawn from point (Xs,Ye) to (Xe,Ys). Since the "window" is an absolute square, this relationship is a onefor-one increment along the Y-Axis for each decrement along the X-Axis, starting at Xs, and ending at Xe.

Value #3: Yam; Y-Axis A-Range Maximum Absolute Count (FIG. 14)

This routine yields the highest number of ridges found on a horizontal line in the Y-Axis "A-Range". The Y-Axis "A-Range" is defined as: Ys≦horizontal line<YC.

Figure 14:
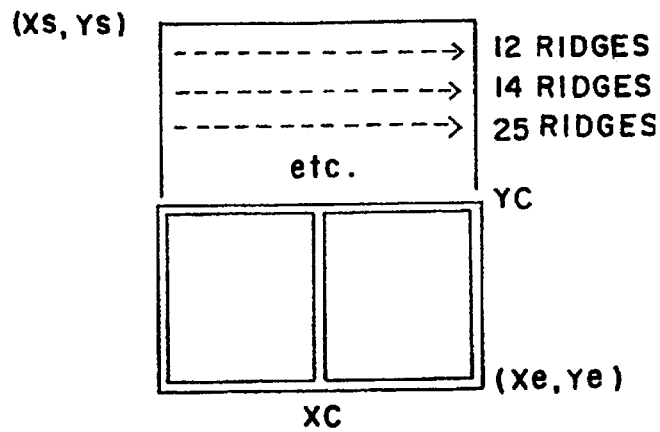
FIG. 14 illustrates the computation of count Yam.

In the example of FIG. 14, of the horizontal lines counted, the value of "Yam" would be set to "25", assuming that no other horizontal line contained a ridge count greater than 25. The "A-Range" is indicated with single-line borders.

Value #4: Ybm; Y-Axis B-Range Maximum Absolute Count (FIG. 15)

This routine yields the number of highest number of ridges found on a horizontal line in the Y-Axis "B-Range". The Y-Axis "B-Range" is defined as: YC<horizontal line≦Ye.

Figure 15:
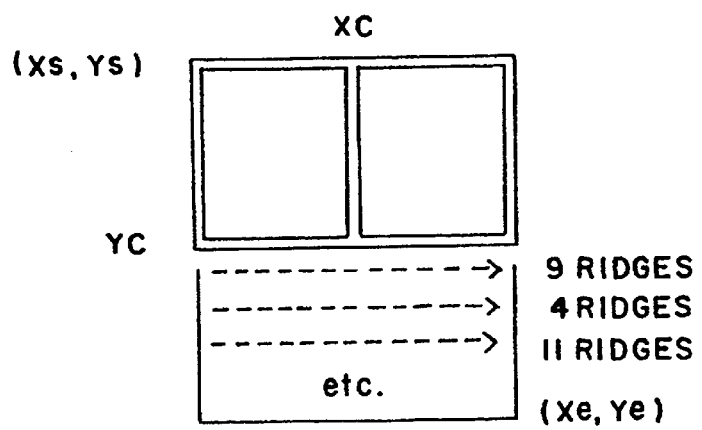
FIG. 15 illustrates the computation of count Ybm.

In the example of FIG. 15, of the horizontal lines counted, the value of "Ybm" would be set to "11", assuming that no other horizontal line contained a ridge count greater than 11. The "B-Range" is indicated with single-line borders.

Values #5 & 6: Ya; Y-Axis A-Range Average Count (FIG. 16)

This routine yields the total number or ridges found on horizontal lines in the Y-Axis "A-Range". For computation purposes, this "overall total" is stored as two numbers, Yaα and Yaβ. Yaα is the total number of 256 ridges in the "overall total" (i.e.: if Yaα is "2", then there are at least 512 ridges in the "overall total"). Yaβ is the remaining number of ridges counted (i.e.: 6) which is always a number under 256. The Y-Axis "A-Range" is defined as: Ys≦horizontal line<YC.

Figure 16:
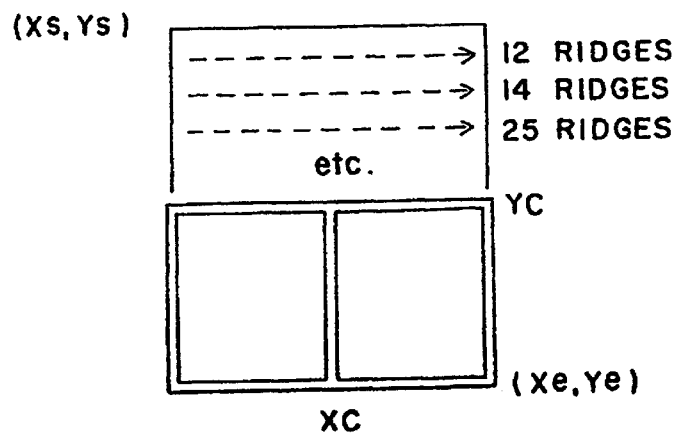
FIG. 16 illustrates the computation of count Ya.

In the example of FIG. 16, if the horizontal lines summed to 516, the value of "Yaα" would be set to "2", and the value of "Yaβ" would be set to "4". The "A-Range" is indicated with single-line borders.

Values #7 & 8: Yb; Y-Axis B-Range Average Count (FIG. 17)

This routine yields the total number of ridges found on horizontal lines in the Y-Axis "B-Range". For computation purposes, this "overall total" is stored as two numbers, Ybα and Ybβ. Ybα is the total number of 256 ridges in the "overall total" (i.e.: if Ybα is "2", then there are at least 512 ridges in the "overall total"). Ybβ is the remaining number of ridges counted (i.e.: 6) which is always a number under 256. The Y-Axis "B-Range" is defined as: YC<horizontal line≦Ye.

Figure 17:
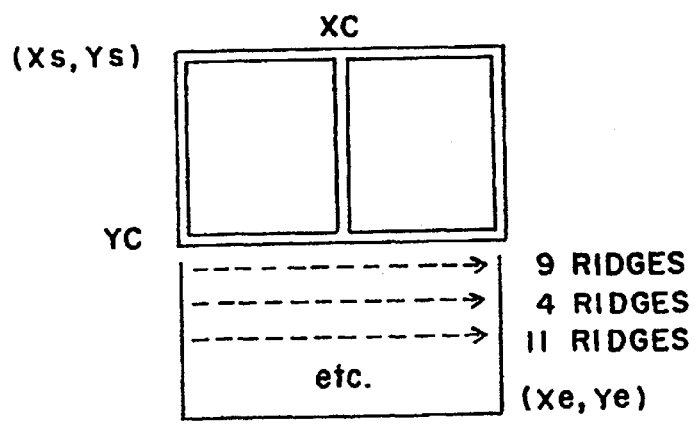
FIG. 17 illustrates the computation of count Yb.

In the example of FIG. 17, if the horizontal lines summed to 300, the value of "Ybα" would be set to "1", and the value of "Ybβ" would be set to "44". The "B-Range" is indicated with single-line borders.

Figure 18:
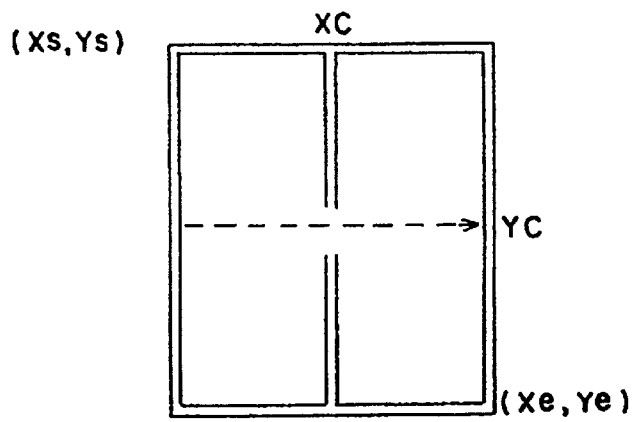
FIG. 18 illustrates the computation of count Yc.

Value #9: Yc; Y-Axis Center Line Absolute Count (FIG. 18)

This routine yields the number or ridges found on the horizontal line on the Y-Axis defined as YC, or Y-Center Line. This would be a whole number, such as 7, if 7 ridges were counted on the Y-Center Line.

Value #10: Xam; X-Axis A-Range Maximum Absolute Count (FIG. 19)

This routine yields the number of highest number of ridges found on a vertical line on the X-Axis "A-Range". The X-Axis "A-Range" is defined as: Xs≦vertical line<XC.

Figure 19:
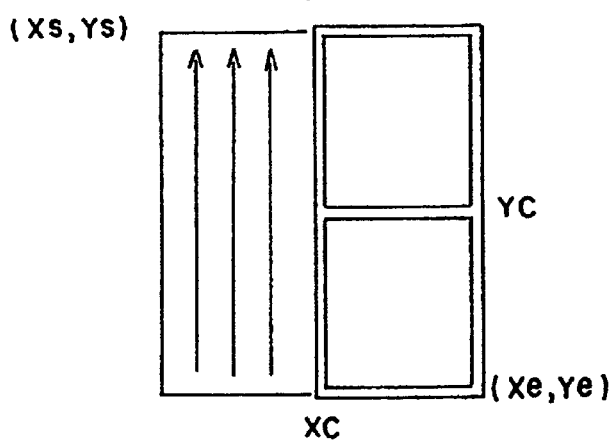
FIG. 19 illustrates the computation of count Xam.

In the example of FIG. 19, of the vertical lines counted, the value of "Xam" would be set to "15", assuming that no other vertical line contained a ridge count greater than 15. The "A-Range" is indicated with single-line borders.

Value #11: Xbm; X-Axis B-Range Maximum Absolute Count (FIG. 20)

This routine yields the number of highest number of ridges found on a vertical line in the X-Axis "B-Range". The X-Axis "B-Range" is defined as: XC<vertical line≦Xe.

Figure 20:
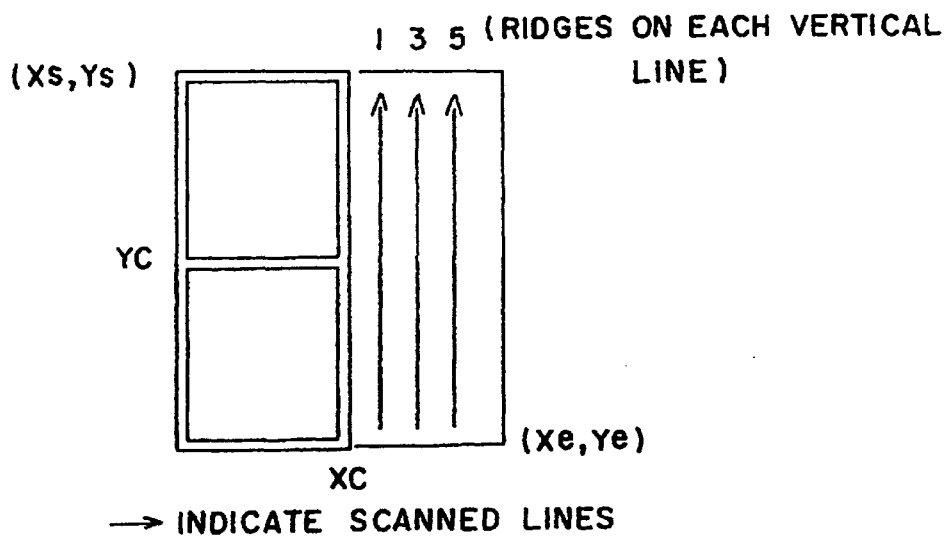
FIG. 20 illustrates the computation of count Xbm.

In the example of FIG. 20, of the horizontal lines counted, the value of "Xbm" would be set to "5", assuming that no other vertical line contained a ridge count greater than 5. The "B-Range" is indicated with single-line borders.

Values #12 & 13: Xa; X-Axis A-Range Average Count (FIG. 21)

This routine yields the total number or ridges found on the vertical lines in the X-Axis "A-Range". For computation purposes, this "overall total" is stored as two numbers, Xaα and Xaβ. Xaα is the total number of 256 ridges in the "overall total" (i.e.: if Xaα is "2", then there are at least 512 ridges in the "overall total") Xaβ is the remaining number of ridges counted (i.e.: 6) which is always a number under 256. The X-Axis "A-Range" is defined as: Xs≦vertical line<XC.

Figure 21:
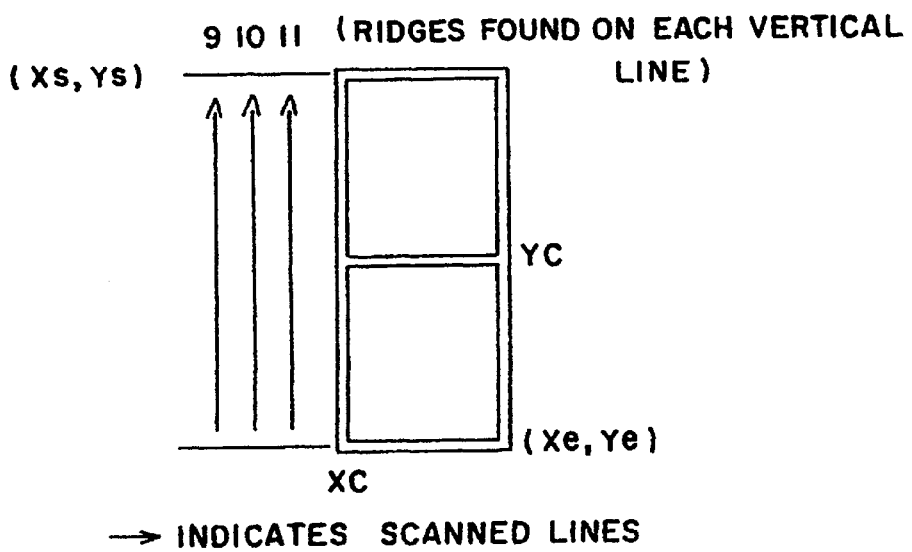
FIG. 21 illustrates the computation of count Xa.

In the example of FIG. 21, if the vertical lines summed to 516, the value of "Xaα" would be set to "2", and the value of "Xaβ" would be set to "4". The "A-Range" is indicated with single-line borders.

Values #14 & 15: Xb; X-Axis B-Range Average Count (FIG. 22)

This routine yields the total number of ridges found on vertical lines in the X-Axis "B-Range". For computation purposes, this "overall total" is stored as two numbers, Xbα and Xbβ. Xbα is the total number of 256 ridges in the "overall total" (i.e.: if Xbα is "2", then there are at least 516 ridges in the "overall total"). Xbβ is the remaining number or ridges counted (i.e.: 6) which is always a number under 256. The X-Axis "B-Range" is defined as: XC<vertical line≦Xe.

Figure 22:
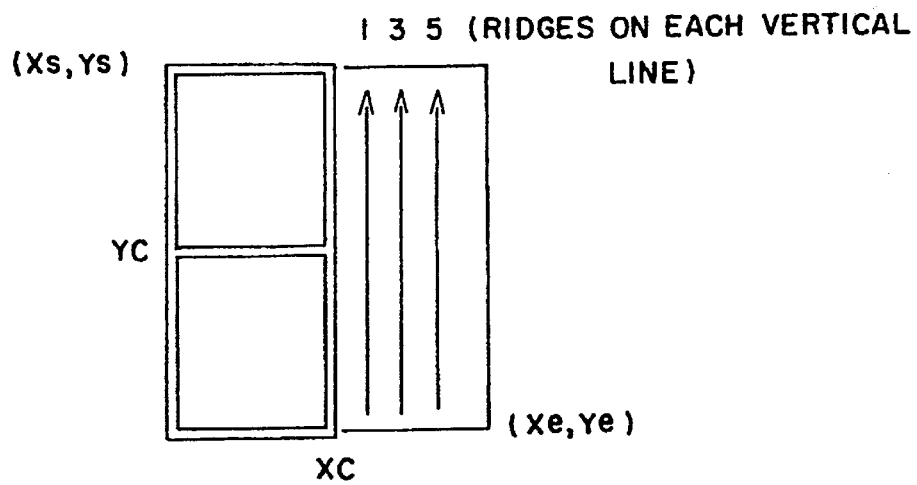
FIG. 22 illustrates the computation of count Xb.

In the example of FIG. 22, if the vertical lines summed to 300, the value of "Xbα" would be set to "1", and the value of "Xbβ" would be set to "44". The "B-Range" is indicated with single-line borders.

Figure 23:
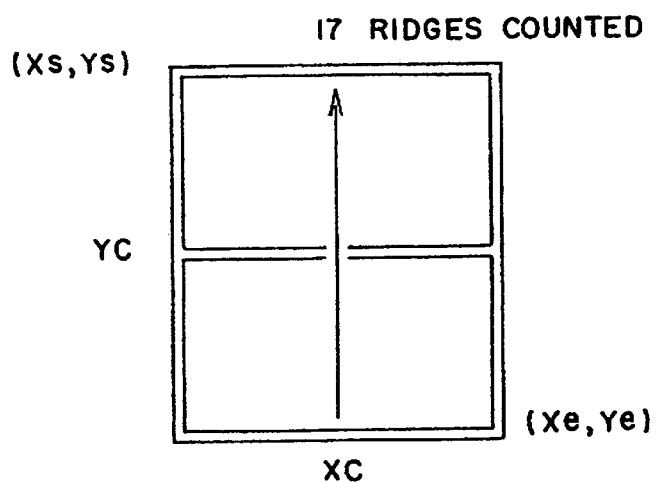
FIG. 23 illustrates the computation of count Xc.

Value #16: Xc; X-Axis Center Line Absolute Count (FIG. 23)

This routine yields the number of ridges found on the vertical line on the X-Axis defined as XC, or X-Center Line. This would be a whole number, such as 17, if 17 ridges were counted on the X-Center Line.

| Generated Data Matrix | |
|---|---|
| Key: | S1 — Diagonal \ Absolute Count |
| | S2 — Diagonal / Absolute Count |
| | Yma — Y-Axis A-Range Maximum Absolute Count |
| | Ymb — Y-Axis B-Range Maximum Absolute Count |
| | Ya — Y-Axis A-Range Average Count |
| | Yb — Y-Axis B-Range Average Count |
| | Yc — Y-Axis Center Line Absolute Count |
| | Xma — X-Axis A-Range Maximum Absolute Count |

-continued

Xmb — X-Axis B-Range Maximum Absolute Count
Xa — X-Axis A-Range Average Count
Xb — X-Axis B-Range Average Count
Xc — X-Axis Center Line Absolute Count Generated Data Matrix:

| 01 | 02 | 03  | 04  | 05 | 06 | 07 | 08  | 09  | 10 | 11 | 12 |
|----|----|-----|-----|----|----|----|-----|-----|----|----|----|
| S1 | S2 | Yma | Ymb | Ya | Yb | Yc | Xma | Xmb | Xa | Xb | Xc |

With reference to the Generated Data Matrix, the Verification Data Generation Routine will now be presented.

This routine takes the output of the Algorithm Data Generation Routine and creates the "Generated Data Matrix". For a full understanding of this process, refer to the two tables: "Algorithm Output Data" and "Generated Data Matrix", presented above.

The first element in the GDM (Generated Data Matrix) is equal to the value of the first number in the AOD (Algorithm Output Data). This element is known as "S1", or the "Diagonal\Absolute Count".

The second element in the GDM is equal to the value of the second number in the AOD. This element is known as "S2", or the "Diagonal/Absolute Count".

The third element in the GDM is equal to the value of the third number in the AOD. This element is known as "Yam", or the "Y-Axis A-Range Maximum Absolute Count".

The fourth element in the GDM is equal to the value of the fourth number in the AOD. This element is known as "Ybm", or the "Y-Axis B-Range Maximum Absolute Count".

The fifth element in the GDM is a calculated value using the fifth and sixth numbers in the AOD. The calculated value can be indicated as follows:

value=(fifth*256+sixth)÷(window-size÷2)

In other words, the computation is equal to the fifth number in the AOD multiplied by 256, plus the sixth number in the AOD. The result is then divided by ½ the window size to give the calculated value. This element is known as "Ya", or the "Y-Axis A-Range Average Count".

The sixth element in the GDM is a calculated value using the seventh and eighth numbers in the AOD. The calculated value can be indicated as follows:

value=(seventh*256+eighth)÷(window-size÷2)

In other words, the computation is equal to the seventh number in the AOD multiplied by 256, plus the eighth number in the AOD. The result is then divided by ½ the window size to give the calculated value. This element is known as "Yb", or the "Y-Axis B-Range Average Count".

The seventh element in the GDM is equal to the value of the ninth number in the AOD. This element is known as "Yc", or the "Y-Axis Center Line Absolute Count".

The eighth element in the GDM is equal to the value of the tenth number in the AOD. This element is known as "Xam", or the "X-Axis A-Range Maximum Absolute Count".

The ninth element in the GDM is equal to the value of the eleventh number in the AOD. This element is known as "Xbm", or the "X-Axis B-Range Maximum Absolute Count".

The tenth element in the GDM is a calculated value using the twelfth and thirteenth numbers in the AOD. The calculated value can be indicated as follows:

value=(twelfth*256+thirteenth)÷(window-size÷2)

In other words, the computation is equal to the twelfth number in the AOD multiplied by 256, plus the thirteenth number in the AOD. The result is then divided by ½ the window size to give the calculated value. This element is known as "Xa", or the "X-Axis A-Range Average Count".

The eleventh element in the GDM is a calculated value using the fourteenth and fifteenth numbers in the AOD. The calculated value can be indicated as follows:

value=(fourteenth*256+fifteenth)÷(window-size÷2)

In other words, the computation is equal to the fourteenth number in the AOD multiplied by 256, plus the fifteenth number in the AOD. The result is then divided by ½ the window size to give the calculated value. This element is known as "Xb", or the "X-Axis B-Range Average Count".

The twelfth element in the GDM is equal to the value of the sixteenth number in the AOD. This element is known as "Xc", or the "X-Axis Center Line Absolute Count".

Fingerprint Identification System Data Confirmation Routine

This routine is responsible for comparing the Comparison Data Matrix (CDM) against the Generated Data Matrix (GDM,) and determining if the fingerprint sample given by the Provider mathematically matches the verification data on the Provider's portable personnel identification means.

Each element of the CDM is compared against its counterpart in the GDM. That is, the first element of the CDM is compared against the first element of the GDM, the second element of the CDM is compared against the second element in the GDM, and so on.

The absolute difference between elements is limited to specific pre-defined "tolerances". These tolerances will vary from application to application, depending on the needs of the end-user. An end-user who wants very strict regulation would have lower tolerances than an end-user who wants average regulation. In other words, one end-user may want ±3 tolerance whereas another might want ±1 tolerance.

As an example, the first through seventh elements will always have one level of tolerance higher than the eighth through twelfth elements. In other words, if the eighth through twelfth elements are measured with a ±2 tolerance, then the first through seventh elements will have a tolerance of ±3.

To determine whether or not a fingerprint sample is approved, a "confidence level" has to be achieved. This confidence level starts at zero. When each CDM/GDM element is compared, and the difference falls within the acceptable tolerance, then the confidence level is increased by 8.33%.

The actual confidence level that must be achieved in order for a fingerprint to be "approved" is again determined by the specific application. One end-user might want a higher confidence level than another end-user.

After all elements have been compared, and the confidence level is determined, a flag is set to indicate whether or not the sample has "passed" the confirmation process.

The entire process (2–Image Capture through 6–Data Confirmation) is repeated up to 10 times.

If a sample is confirmed two consecutive times, then the fingerprint sample is "approved", an appropriate confirmation message is generated for the Obtainer to view, and the device recycles.

If a sample is rejected two consecutive times, then the fingerprint sample is "failed", an appropriate rejection message is generated for the Obtainer to view, and the device recycles.

If in the ten process cycles the firmware cannot obtain two consecutive "passes" or "failures", then the fingerprint sample is "unable to verify", an appropriate message is generated for the Obtainer to view, and the device recycles.

It should be apparent to any person skilled in the art to which this invention pertains that the disclosure set forth hereinabove with respect to the calculation of the plurality of counts, with reference to either a diagonal line or a horizontal line or a vertical line, pertains to a line of memory data contained within the fingerprint identity window area being analyzed.

The foregoing has been disclosed with respect to a preferred method and system wherein the Generated Data Matrix provides 24 bytes of fingerprint identification data, each element of the GDM containing 2 bytes of verification data. The 24 byte non-minutiae digitized numerical identifier is recordable within the confines of a portable personnel identification means and in particular, the magnetic stripe of a credit card to allow the credit card to be used as an identification card for entitling the user to certain services, as for example, charged purchases and check cashing. This digitized numerical identifier can also be stored in a memory means included in a smart card.

As to the particular application of the invention system and methods for providing a 24 byte non-minutiae digitized numerical identifier which is recordable within the magnetic stripe of a credit card to allow the credit card to be used as a portable personnel identification card, regulations of the American National Standards for financial services, financial transaction cards magnetic stripe encoding, limit the magnetic stripe and coding as follows:

TRACK 1 maximum of 79 alphanumeric characters

TRACK 2 maximum of 40 characters, numeric only

TRACK 3 maximum of 107 alphanumeric characters

Various other market applications of the present invention system and methods are as follows:

Retail Credit Card

Government-federal/State/Local

Used to identify the voter; controlling multiple voting

Drivers License; control verification of individual for legal drinking age.

System could be used in control of aliens on green cards and work visa's

Social Security cards . . . verification of holder for check cashing requirements.

Military ID cards for all branches.

Control of welfare recipients and check cashing.

Security Market

Banking industry . . . Automatic Tellers (ATM's), safety deposit boxes.

Professional Market

Medical . . . ID cards.

Education Market

College entrance exams.

Legal Bar Exams.

Other Markets

Passports.

Prisons.

Security . . . Computer access as well as commercial use.

Variable Resolution

The foregoing presentation of the invention methods for image sizing, image framing, and that set forth with respect to defining a fingerprint identity window, bear reference to a resolution area base 256. It should be apparent that the present invention is not limited to this exemplary resolution area since it is well within the teachings and scope of the present invention to employ a resolution area base 512. Accordingly, it will be apparent to those skilled in the art in light of the foregoing disclosure that the invention should not be limited to a resolution area base 256.

Encryption/Decryption

Verification String encryption routines can take a myriad of forms. Each scheme is application dependent, meaning that a scheme used for one application will not be used in a similar application—thus reducing the possibility of fraud. Since the scheme for each application is different, and bound in the verification firmware EPROMS, the possibility of unauthorized card duplication is reduced, as duplicated cards for one application would not yield valid verification data in another application. Two exemplary encryption schemes are as follows:

Scheme 1: Digit Reversal Scheme

This "encryption scheme" takes each of the twelve numbers in the Verification String and reverses the digits. In other words, if the Verification String contains the following numbers:

01 40 36 24 22 05 10 18 14 21 04 07 then the "encrypted" data would appear as follows:

10 04 63 42 22 50 01 81 41 12 40 70

To "decrypt" the data in an application program, the programmer need only reverse the digits back to obtain the original numbers.

Scheme 2: Digit Complement Scheme

This "encryption scheme" operates on all 24 digits of the Verification String as a whole, treating each digit as a separate entity. Each digit is subtracted from nine (9) to achieve a "complement" value. For instance:

01 40 36 24 22 05 10 18 14 21 04 07 would appear as follows once encrypted:

98 59 63 75 77 94 89 81 85 78 95 93

This complement scheme has the same affect as taking each of the twelve numbers and subtracting each number from ninety-nine (99) to achieve the "encrypted" value.

To reverse the process, the user only need to subtract 9 from each of the 24 encrypted digits to achieve the original number (ignoring the negative sign).

As stated above, data encryption will vary from application to application, to avoid multiple applications from having similar verification data, and thus introducing potential misuse of the encrypted verification data. The encryption method is decided in advance, and appropriate decryption logic is programmed into the Comparison Data Retrieval Routine, such that the decrypter logic and means of implementation are contained in the BCC52 processor of the system invention.

As to the implementation of the encryption scheme aspect of the present invention, in addition to providing a fingerprint sample, the Provider also presents identification card means (i.e., identification card with a magnetic stripe) which contains his or her encrypted verification data (i.e., encrypted digitized numerical identifier), the identification card is then placed in the card reader for retrieval and decryption of the "comparison data".

Upon decryption, the "comparison data" is stored in a 12 element array, known as the "Comparison Data Matrix", which has the same layout as the "Generated Data Matrix" presented hereinbefore.

If any errors are encountered during this retrieval process, then an appropriate error message is generated and the system recycles. Such error messages are specific to the individual application (i.e., a system with a magnetic stripe card reader would have a "Card Reader Error" or a "Channel Read Error" error message). Furthermore, the encrypted identifier could also be included on a check payable within a check cashing identity verification application of the present invention.

As set forth in the appended claims, the present invention is applicable to: recording an encrypted or non-encrypted non-minutiae digitized numerical identifier within the confines of a portable personnel identification means, personal to a person, such as a credit card or a smart card; identity verification of a person to be identified with or without an encryption scheme; and payable check verification of identity of payee, with or without encryption.

As to the recording application, two services could be performed: (1) direct or indirect personal contact with the persons to be identified, deriving non-minutiae digitized numerical identifiers indicative of the fingerprints of such persons, and recording the non-minutiae digitized numerical identifiers within identification means, personal to such persons; or (2) performing such a service but providing the derived non-minutiae digitized numerical identifiers to another party for the performance of the recording procedure.

As to the Identity Verification Application of the present invention, this could be accomplished with direct or indirect personal contact with persons to be identified.

With regard to the payable check verification of identity of a check payee, the check payable could include a numerical identifier to be verified with a digitized numerical identifier indicative of a fingerprint of a check payee named on the check payable, or preferably no numeric identifier would be included on the check payable and verification of the identity of the person submitting the check payable in a check cashing application would be accomplished by verification of comparison of a non-minutiae digitized numerical identifier indicative of a fingerprint of a person submitting the check for cashing, with the numerical identifier contained within a portable personnel identification means submitted by such person for identification as the check payee of the check payable.

With reference back to the identification verification application of the present invention, where verification of identity is accomplished by comparing the numerical identifier of identification means with the non-minutiae digitized numerical identifier derived from a fingerprint of such person to be identified, upon finding non-verification, the portable personnel identification means would be withheld by the invention system, or in the case where a smart card is presented as the identification means, the functional integrity of such smart card could be destroyed by known techniques and devices incorporated into the system invention.

Thus, it is apparent that there has been provided, in accordance with the invention, an identification system that fully satisfies the objectives, aims and advantages set forth above. While the invention methods have been described in conjunction with specific applications thereof, it is evident that many alternatives, modifications and variations will be apparent to those skilled in the art in light of the foregoing description. Accordingly, it is intended to embrace all such alternatives, modifications and variations which fall within the spirit and scope of the appended method claims.

The terms and expressions which have been employed in the foregoing specification are used therein as terms of description and not solely of limitation, and there is no intention, in the use of such terms and expressions, of excluding equivalents of the features shown and described or portions thereof, it being recognized that the scope of the invention is defined and limited only by the appended method claims.

Fingerprint Identification System Invention

A description of the system invention will now be presented with reference to FIGS. 24–32 which are illustrative of the system invention, and FIGS. 4–6B and FIGS. 33 and 34 which provide flow charts which are descriptive of the operation control of the system invention.

Figure 24:
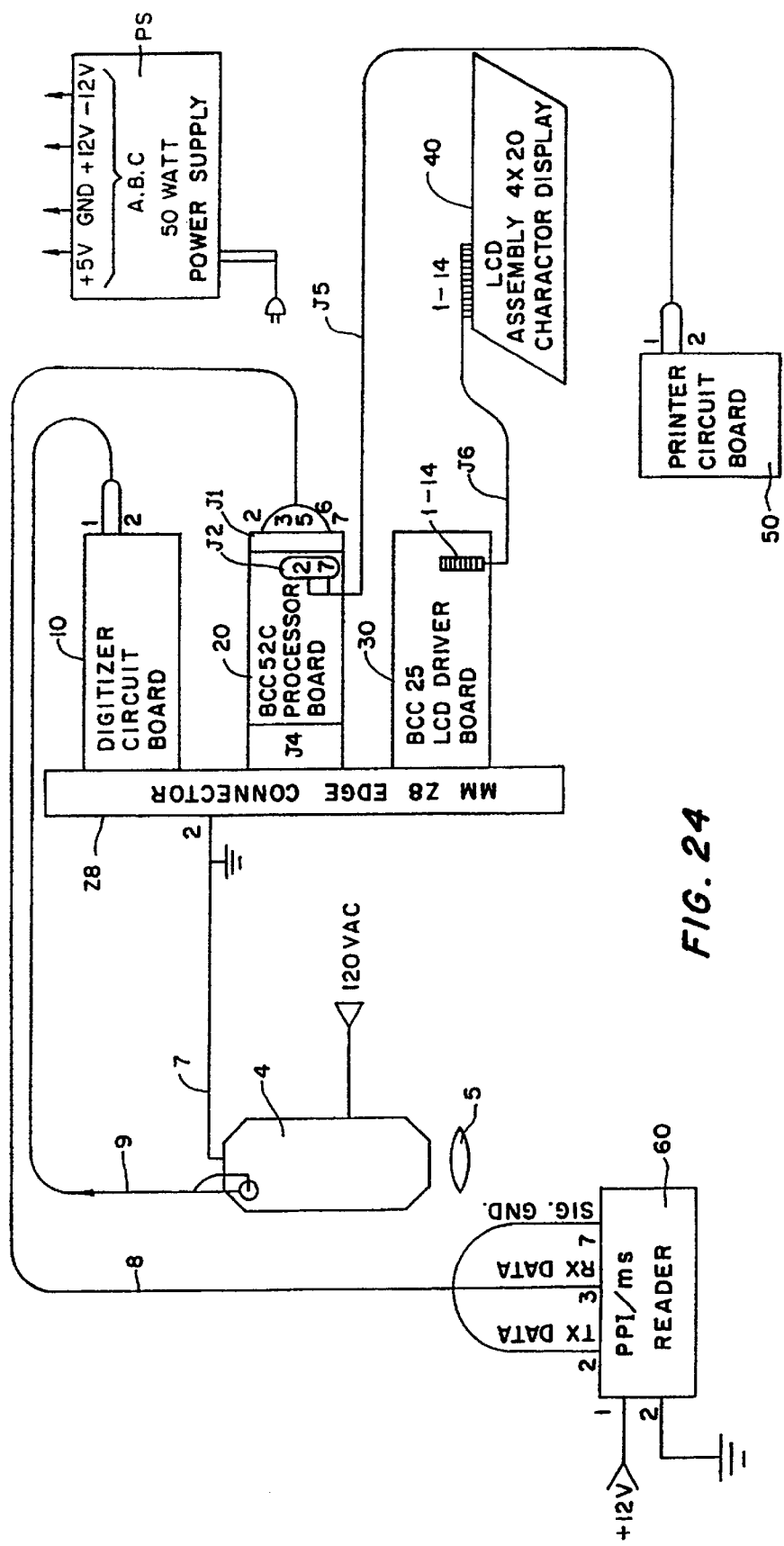
FIG. 24 depicts a block diagram of the system invention.

FIG. 24 is a block diagram of the invention system which shows the basic interconnection of the system components including the video camera 4, and the accessories LCD display 40, printer means 50, and PPI/MS Reader 60. An illustrative power supply means PS for providing appropriate voltage supply to the system components is also shown.

The system invention can be embodied in three specific configurations which differ from each other as to the application of the system invention and the components utilized for a respective application. Each of the three embodiments incorporate the following: an inkless framed format holder means 3, video scanning means 4, lens 5, digitizer 10, processor 20, LCD driver means 30, a four-slot motherboard bus connector Z8, and a portable personnel identification card reader means 60.

Prior to presenting a description for each embodiment of the system invention, the basic system as depicted in FIG. 24 will now be described.

Video scanner 4 scans an inkless format means providing an image of a fingerprint of a person to be identified, after this fingerprint image format 1 is placed within the inkless format holder means 3 which automatically positions the format 1 in relation to the video scanner 4 in such a way that the position is predetermined and will be reestablished each time that a print format means is placed before the video scanner, thus insuring that a subsequent scanning operation will always produce consistent and reliable field of scan results.

As shown in FIG. 24, the video output of scanner 4 is connected to digitizer 10 via a shielded coaxial cable 9. The video scanner 4 receives power from the 120 volts AC supply, and a ground is provided via line 7 from pin 2 of Z8. In operation, the video scanner scans the image of a fingerprint provided on an inkless means 2 to produce fingerprint image data and whitespace data which is outputed to the video digitizer board 10.

The primary function of the video digitizer board 10 is to convert the fingerprint image and whitespace data signals from the video scanner into digital image data i.e., numerical data, which digital image data is stored in an addressable memory means, RAM, included in the digitizer 10. Thus, the stored digital image data is then available to the system program-controlled processor 20 for evaluation of the scanned image data information.

The scanned image data information contained in the video camera output signal is made up of discrete points of picture elements, commonly called pixels. Each pixel varies in brightness, depending on the image scanned, through a range of "grey levels" from black to white. In digitizer 10, these grey levels are separated into 16 numerical values from 0 (black) to 15 (white). Each horizontal line of the image data being viewed contains 256 pixels and the circuitry of the digitizer samples 256 lines. This results in 65,536 pixels or discrete numerical values that the digitizer must store in its random access memory means. Since the pixels are supplied in a scanning sequence (from left to right in the viewed image) it is necessary that the sampling in some subsequent storage of the pixel values be synchronized with camera scanning sequence. Signals are provided, along with the fingerprint image and whitespace data outputed from the camera. These combined signals, image and sync, are commonly referred to as "composite video".

Circuit means of the digitizer functions to extract both horizontal (line) and vertical (frame) synchronization signals. Other circuitry of the digitizer 10 allows the system microprocessor 20 to control a variety of functions under software control. The primary function of the digitizer 10, as referred to earlier, is to convert the scanned image data into numerical values for later evaluation by the software controlled processor. The operation of the digitizer 10 of the invention is well known to those skilled in the art and a specific designation of a digitizer utilized in the system invention is presented hereinafter along with designations for the other components incorporated into the present system.

The program-controlled processor means 20 selectively analyzes a plurality of different fingerprint pattern parts of the digital image data contained in the digitizer, and the processor includes means for accomplishing the inventive methods set forth in the foregoing, such as means for computing a ridge count for each of the plurality of selectively analyzed different fingerprint pattern parts, means for compiling a data matrix comprised of ridge counts computed for these different fingerprint pattern parts, means to provide a non-minutiae digitized numerical identifier indicative of the image of the fingerprint of a person to be identified, and means for comparing the numerical identifier provided by the card reader 60 with the non-minutiae digitized numerical identifier, to verify the identity of a person to be identified. Reference to the foregoing description will also provide information as to the other inventive methods of the invention such as that set forth for Image Capture, Image Sizing and the defining of a fingerprint identity window.

The flow charts illustrated in FIGS. 4–6B, 33 and 34 provide the system operations performed by the processor means 20 under software control.

The LCD Driver means 30 communicates with the processor 20 via J4 and Z8, and its output is connected to LCD display means 40 via connector J6.

Printer 50 is connected to processor 20 via connector J5.

A portable personnel identification means magnetic-stripe reader 60 is connected to processor 20 via RS-232-C, 25 pin serial connector 8 and connector J1. This reader is provided with a simple reset circuit (not shown) to initialize the control microprocessor when power is first supplied to the system.

Appendix A attached hereto describes the software utilized in the system of the invention.

The disclosure set forth hereinabove and attached hereto, with reference to the drawings, will enable any person skilled in the art to which this invention pertains, to assemble and operate the system invention in accordance with the inventive methods provided herein.

The specific circuitry incorporated in the particular embodiment of an automatic fingerprint identification system constructed in accordance with the present invention and described with reference to the respective drawings, can be constructed from discrete elements more advantageously as from integrated circuits. The following Table lists examples of such components.

TABLE A

| Component | Description |
| --- | --- |
| Inkless material | Identicator Corporation |
| Video camera | Associated Systems Model # TC1886, |
| Camera lens | 16 mm, F/1.6 (no iris) |
| PPI/MS card reader | American Magnetics Corporation-Model 101 |
| Smart card reader | Microcard Technologies |
| Video digitizer | VIP Ltd - Model #D10010 |
| Processor | Micromint, Inc. - Model #BCC52C |
| LCD Driver | Micromint, Inc. - BCC25, BCC52C ROM A&B, MB04 Passive Backplane |
| Printer | Printer Products - Dot Matrix Printer-40 columns |

The MBO 4-slot motherboard Z8 is an 8 BUS configuration. The processor BCC52C contains RAM/EPROM, an EPROM programmer, 3 parallel ports, and 2 serial ports.

System Embodiments

Figure 29:
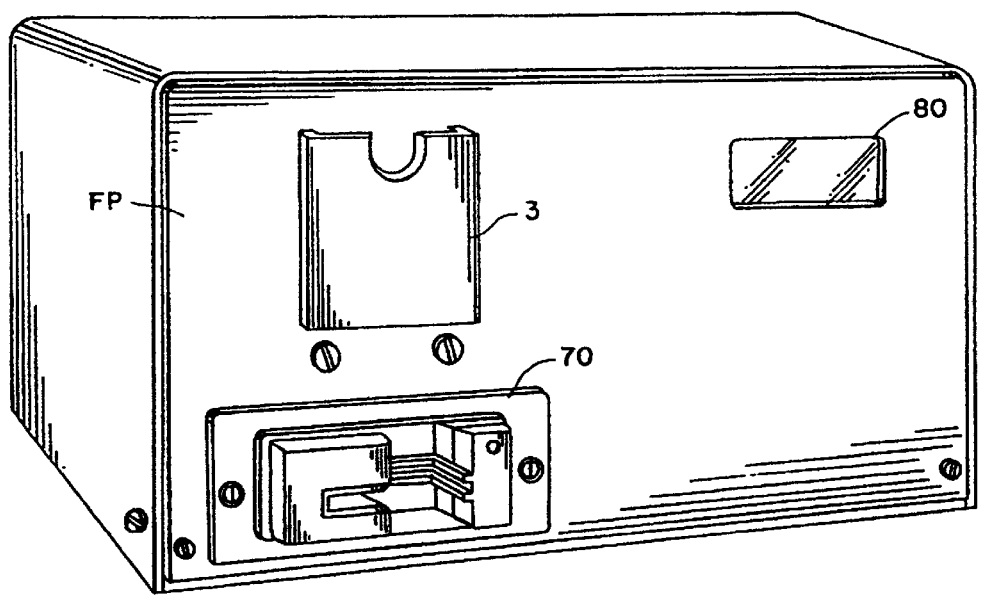
FIG. 29 illustrates one embodiment of the system invention employed in application pertaining to personnel identity verification, which embodiment incorporates the use of PPI/MS Reader 60.

FIG. 29 illustrates a first embodiment of the system invention which incorporates a PPI/MS Reader 60, card entry means 70 and an LCD display window 80 to display messages from LCD assembly 40, this embodiment being devoid of a printer. The fingerprint format holder means 3 for positioning a fingerprint format in a predetermined scanned position is shown. This holder means 3 is fixedly attached to the faceplate FP of the housing. The faceplate FP includes an appropriately positioned, square-hole, around which the format holder means is attached in a predetermined position. This allows the video camera 4 to have viewing access to the fingerprint image contained within a fingerprint format means 1 after it is placed within the fingerprint format holder 3.

The faceplate has mounted on its inner side electroeluminance lamps which illuminate the field of view of the video camera. One of the lamps is mounted in a predetermined position, angled downwardly from the top of the hole, and the other lamp is appropriately mounted and angled from the bottom of the hole.

Figure 30:
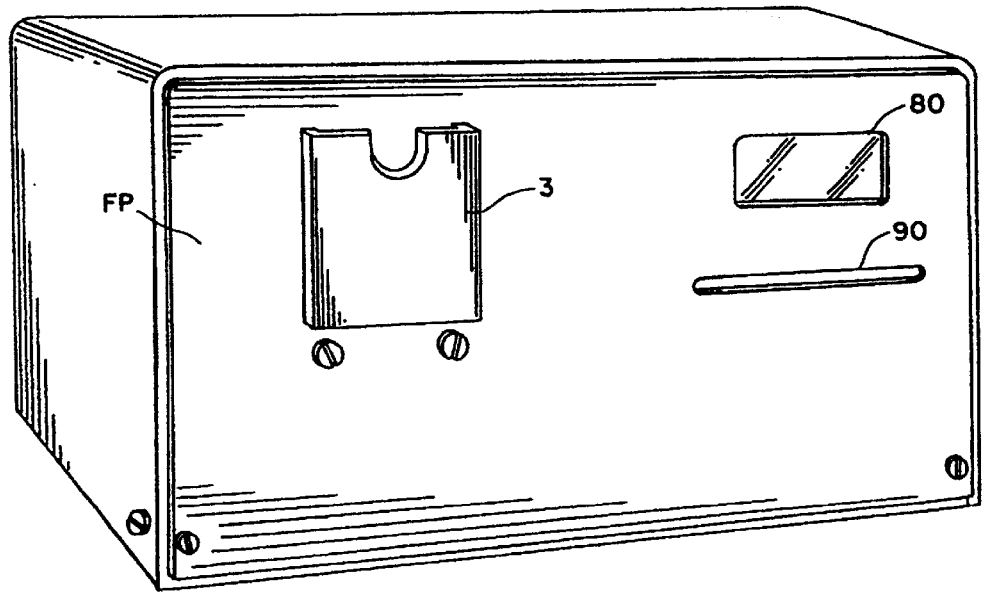
FIG. 30 illustrates a second embodiment of the system invention employed in an application pertaining to personnel identity verification, which embodiment incorporates the use of a smart card identification means.
Figure 33:
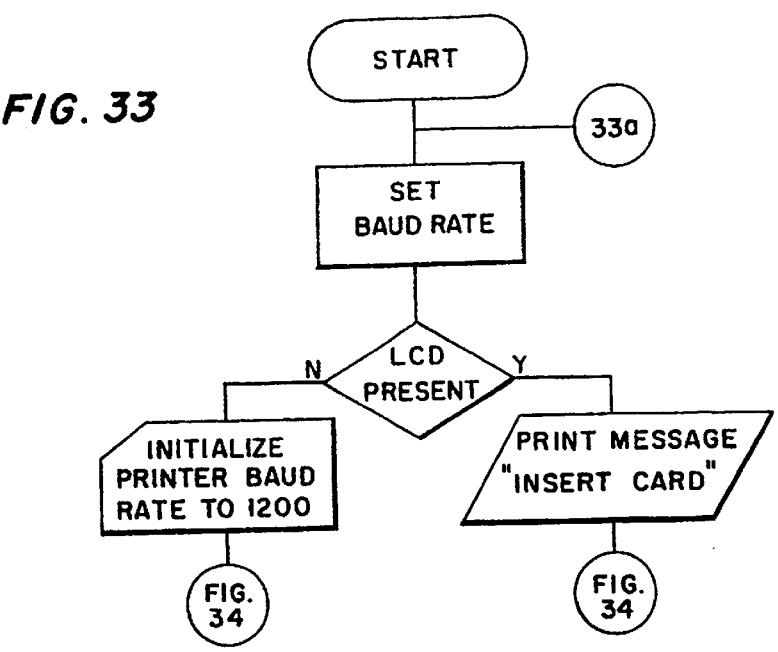
FIG. 33 is a flow diagram of a firmware/software control process of the present invention.
Figure 34:
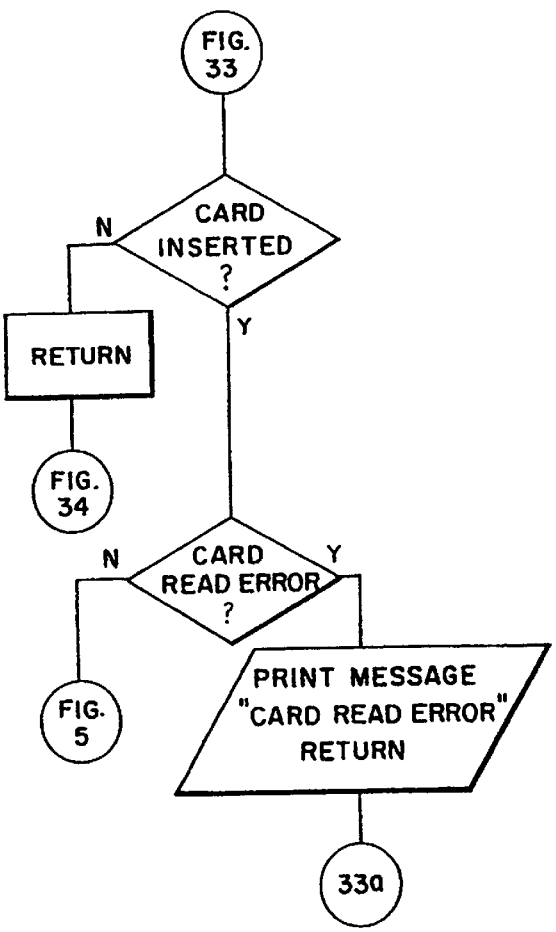
FIG. 34 is a flow diagram of a software process of the invention for card initialization.

FIG. 30 illustrates a second embodiment of the system invention in the application wherein a smart card is provided as the portable personnel identification card means. A smart card reader means (not shown) replaces the PPI/MS reader 60 in the basic system circuitry, and a smart card access slot means 90 is provided to allow entry of the smart card into the smart card reader. This embodiment incorporates the same LCD components, and is devoid of a printer.

FIG. 31 illustrates a third embodiment of the system invention application to payable check verification of identity of a check payee, as set forth hereinbefore. This embodiment employs an identification card reader means 60 and associated means 70, or can employ an appropriate smart card reader means when a smart card is used as the personnel identification card means. Printer means 50 is incorporated in this embodiment to print on a check payable an identification verification message, or any other message provided by this system invention. Slots 92 and 94 are provided to allow access to and from the printer which is accomplished by inserting a check payable into slot 94, and after the system operation is completed, the check will be returned via slot 92.

The specific operations of each of the three embodiments described above is set forth in the foregoing description and in the appended claims.

Thus, it is apparent that there has been provided, in accordance with the system invention, a non-minutiae automatic fingerprint identification system that fully satisfies the objectives, aims and advantages set forth above. While the invention system has been described in conjunction with specific embodiments thereof, it is evident that many alternatives, modifications and variations will be apparent to those skilled in the art in light of the foregoing description. Accordingly, it is intended to embrace all such alternatives, modifications and variations which fall within the spirit and scope of the appended system claims.

What is claimed is:

1. A method of verifying the identity of a person comprising the steps of:
    a) obtaining a fingerprint of a person to be identified provided via the use of an inkless material which when touched by a finger of said person causes immediate development of an image of the fingerprint of said finger in a black and white appearance,
    b) providing a portable personnel identification, personal to said person, having recorded therewith a non-minutiae numerical identifier which identifies the fingerprint of the said finger of said person,
    c) electronically reading said numerical identifier recorded on said portable personnel identification, and electronically storing in memory the said numerical identifier,
    d) video scanning said image of said fingerprint provided by said inkless means to produce fingerprint image data, electronically storing in digital form in an addressable memory said fingerprint image data, and digitizing, electronically, on a non-minutiae basis, the said fingerprint image data to produce a non-minutiae digitized numerical identifier indicative of said fingerprint,
    e) comparing the numerical identifier of said identification stored in said memory with said non-minutiae digitized numerical identifier stored in said addressable memory, to verify the identity of said person.

2. A method as defined in claim 1, further comprising as to step a) above: using the index finger of said person to be identified to provide said fingerprint.

3. A method as defined in claim 1, further comprising as to step a) above: using the thumb of said person to be identified to provide said fingerprint.

4. A method as defined in claim 1, further comprising as to step b) above: providing a credit card as said portable personnel identification, personal to said person.

5. A method as defined in claim 1, further comprising as to step d) above: using a video camera to video scan the said image of the said fingerprint provided on the said inkless material.

6. A method as defined in claim 1, further comprising the step of: prior to digitizing the said image data, storing in a random-access memory means the scanned image of the said fingerprint provided on the said inkless material.

7. A method as defined in claim 1, further comprising: displaying verification of the identity of said person.

8. A method as defined in claim 7, further comprising: displaying non-verification of the identity of the said person.

9. A method as defined in claim 8, further comprising: withholding said portable personnel identification upon occurrence of non-verification of the identity of said person.

10. A method as defined in claim 9, further comprising: withholding a credit card provided as said personal personnel identification upon occurrence of non-verification of the identity of said person.

11. A method as defined in claim 1, further comprising as to step a) above: using a toe of a person to be identified to provide an identification print.

12. A method for the automatic non-minutiae identification of a fingerprint image comprising in combination:
    a) video scanning an image of a fingerprint of a person to be identified;
    b) electronically storing, in digital form, in an addressable memory, fingerprint image data produced from video scanning said image of a fingerprint;
    c) selectively analyzing, electronically, on a non-minutiae basis, a plurality of different fingerprint image parts of the stored fingerprint image data and computing a count for each of said plurality of fingerprint image parts; and
    d) compiling a data matrix comprised of a plurality of counts computed for the said plurality of different fingerprint image parts to provide a non-minutiae digitized numerical identifier indicative of said image of a fingerprint of a person to be identified.

13. A method as defined in claim 12 further comprising: providing said image of a fingerprint via the use of an inkless material which when touched by a finger of said person causes immediate development of said image of a fingerprint of the said person.

14. A method as defined in claim 13 further comprising: providing a non-minutiae digitized numerical identifier having less than 400 bytes of fingerprint identification data.

15. A method as defined in claim 13 further comprising: providing a non-minutiae digitized numerical identifier having 24 bytes of fingerprint identification data.

16. A method as defined in claim 13 further comprising: providing said image of a fingerprint by using the index finger of said person.

17. A method as defined in claim 13 further comprising: providing said image of a fingerprint by using the thumb of said person.

18. A method as defined in claim 13 further comprising: providing said image by using a toe of said person.

19. A method for the automatic non-minutiae identification of a fingerprint of a person to be identified, comprising the steps of:
    a) video scanning an image of a fingerprint and producing fingerprint image data and whitespace data;
    b) electronically storing in digital form, in an addressable memory, said fingerprint image data and whitespace data;
    c) determining the location of the said fingerprint image data stored in digital form in said addressable memory with the said whitespace data;
    d) defining a fingerprint identity window within said fingerprint image data stored in the said addressable memory;
    e) selectively analyzing, electronically, on a non-minutiae basis, a plurality of different fingerprint image parts of the said fingerprint image data contained within said fingerprint identity window and computing a count for each of said plurality of fingerprint image parts; and f) compiling a data matrix comprised of a plurality of counts computed for the said plurality of fingerprint image parts to provide a non-minutiae digitized numerical identifier indicative of said image of a fingerprint of a person to be identified.

20. A method as defined in claim 19, further comprising: providing a non-minutiae digitized numerical identifier having less than 400 bytes of fingerprint identification data.

21. A method as defined in claim 19, further comprising: providing a non-minutiae digitized numerical identifier having less than 100 bytes of fingerprint identification data.

22. A method as defined in claim 19, further comprising: providing a non-minutiae digitized numerical identifier having 24 bytes of fingerprint identification data.

23. A method as defined in claim 19, further comprising: defining said fingerprint identity window by determining the dimensions of said window around an origin point defined as (XC, YC), wherein XC=X-END minus (X-END minus X-START) divided by 3, and YC=Y-END minus (Y-END minus Y-START) divided by 2.

24. A method as defined in claim 19, further comprising as to step c):
  image framing the said fingerprint image data and whitespace data to a predetermined dimension, and establishing Y-TOP and Y-BOTTOM values along the Y-axis of said predetermined dimension;
  computing the X-Axis Range of the fingerprint image data contained in the framed image data by determining two X-axis values, said X-axis values being X-START and X-END, wherein X-START indicates the memory data location where the fingerprint image data starts on the X-axis, and X-END indicates the memory data location where the fingerprint image data ends on the X-axis;
  computing the Y-Axis Range of the fingerprint image data contained in the framed image data by determining two Y-axis values, said Y-axis values being Y-START and Y-END, wherein Y-START indicates the memory data location where the fingerprint image data starts on the Y-axis, and Y-END indicates the memory data location where the fingerprint image data ends on the Y-axis; and
  determining the dimensional area of said fingerprint image data by utilizing said X-START, X-END, Y-START and Y-END values.

25. A method as defined in claim 23, further comprising: defining the dimensional area of the said fingerprint identity window by predetermining a window-size for said fingerprint identity window and defining said dimensional area as from (XC−DIFF, YC−DIFF) to (XC+DIFF, YC+DIFF) where DIFF=½ (window-size minus 1) and (XC−DIFF)=Xs, (XC+DIFF)=Xe, (YC−DIFF)=Ys, and (YC+DIFF)=Ye.

26. A method as defined in claim 1, wherein said numerical identifier recorded within said portable personnel identification means and said non-minutiae digitized numerical identifier each have less than 400 bytes of fingerprint identification data.

27. A method as defined in claim 4, wherein said numerical identifier recorded within said credit card and said non-minutiae digitized numerical identifier each have 24 bytes of fingerprint identification data.

28. An automatic non-minutiae fingerprint identification system comprising in combination:
  fingerprint format holder means for positioning a fingerprint format in a predetermined scan position;
  video scanner means for electronically scanning an image of a fingerprint of a person to be identified provided by said fingerprint format, to produce image data including fingerprint image data and whitespace data;
  video digitizer means for electronically converting said fingerprint image data and whitespace data into digital image data;
  addressable memory means for storing said digital image data;
  program-controlled processor means for selectively analyzing, electronically, on a non-minutiae basis, a plurality of different fingerprint image parts of the said digital image data stored in digital form in said addressable memory means, to provide a non-minutiae digitized numerical identifier indicative of said image of a fingerprint of a person to be identified;
  portable personnel identification card reader means for reading a numerical identifier recorded within the confines of a portable personnel identification card means and indicative of said fingerprint of said person to be identified;
  memory means for storing said numerical identifier read by said card reader means; and
  means for comparing the said numerical identifier with said non-minutiae digitized numerical identifier, to verify the identity of the said person to be identified.

29. A system as defined in claim 28 further comprising: means for defining a fingerprint identity window within the said digital image data.

30. A system as defined in claim 28 further comprising: means for image framing the said digital image data to a predetermined dimension and for determining the location of the said fingerprint image data within the said digital image data.

31. A system as defined in claim 28 further comprising LCD display means for displaying system messages.

32. A system as defined in claim 31 wherein said program-controlled processor means provides a non-minutiae digitized numerical identifier having less than 400 bytes of fingerprint identification data.

33. A system as defined in claim 31 wherein said program-controlled processor means provides a non-minutiae digitized numerical identifier having less than 100 bytes of fingerprint identification data.

34. A system as defined in claim 31 wherein said program-controlled processor means provides a non-minutiae digitized numerical identifier having 24 bytes of fingerprint identification data.

35. A system as defined in claim 31 further comprising: inkless fingerprint format means for providing said image of a fingerprint.

36. A system as defined in claim 29 further comprising: inkless fingerprint format means for providing said image of a fingerprint.

37. A system as defined in claim 30 further comprising: inkless fingerprint format means for providing said image of a fingerprint.

38. A system as defined in claim 28 further comprising: inkless fingerprint format means for providing said image of a fingerprint.

* * * * *